US 8,909,496 B2

(12) United States Patent
Carroll et al.

(10) Patent No.: US 8,909,496 B2
(45) Date of Patent: Dec. 9, 2014

(54) GRAVITY GRADIOMETER AND METHODS FOR MEASURING GRAVITY GRADIENTS

(75) Inventors: Kieran A. Carroll, Brampton (CA); John Barry French, Oakville (CA); Keith Richard William Morrison, Oakville (CA)

(73) Assignee: Gedex Inc., Mississauga (CA)

( * ) Notice: Subject to any disclaimer, the term of this patent is extended or adjusted under 35 U.S.C. 154(b) by 545 days.

(21) Appl. No.: 13/399,533

(22) Filed: Feb. 17, 2012

(65) Prior Publication Data

US 2012/0210783 A1    Aug. 23, 2012

Related U.S. Application Data

(60) Provisional application No. 61/443,987, filed on Feb. 17, 2011.

(51) Int. Cl.
*G01L 25/00* (2006.01)
*G01V 7/06* (2006.01)
*G06F 11/30* (2006.01)

(52) U.S. Cl.
CPC .................................. *G01V 7/06* (2013.01)
USPC ............ 702/105; 702/182; 702/188; 702/189

(58) Field of Classification Search
CPC ........................................................ G01V 7/06
USPC .................. 702/105–107, 182–190
See application file for complete search history.

(56) References Cited

U.S. PATENT DOCUMENTS

| 6,212,952 B1 * | 4/2001 | Schweitzer et al. ........ 73/382 G |
| 6,612,171 B1 | 9/2003 | Stephenson et al. |
| 7,305,879 B2 | 12/2007 | Moody et al. |
| 2009/0064778 A1 | 3/2009 | Metzger et al. |

OTHER PUBLICATIONS

De Bra, DB Harrison, J.C, and Muller, P.M., "A proposed Lunar Orbiting Gravity Gradiometer Experiment", pp. 103-112, Conference of Lunar Geophysics, Oct 18-21, 1971, Houston, Texas, USA.*
Shaw, H., and Lancaster-Jones, E., "Application of the Eötvös Torsion Balance to the Investigation of Local Gravitational Fields", pp. 204-212, dated Feb. 24, 1923.
De Bra, D. B., Harrison, J.C., and Muller, P.M., "A Proposed Lunar Orbiting Gravity Gradiometer Experiment", pp. 103-112, Conference of Lunar Geophysics, Oct. 18-21, 1971, Houston, Texas, U.S.A.
McGuirk, J. M., Foster, G. T., Fixler, J. B., Snadden, M. J., and Kasevich, M. A., "Sensitive Absolute-Gravity Gradiometry Using Atom Interferometry", pp. 1-14, Physical Review A, vol. 65, 033608, Published Feb. 8, 2002.

(Continued)

*Primary Examiner* — Phuong Huynh
(74) *Attorney, Agent, or Firm* — Bereskin & Parr LLP/S.E.N.C.R.L., s.r.l.

(57) ABSTRACT

Systems and methods for determining a bias-corrected value of at least one component of a gravity gradient tensor using a gravity gradiometer and a measurement bias of the gravity gradiometer wherein the measurement bias varies with time, by taking at least three measurements with the gravity gradiometer positioned in at least two orientations. Any gravity gradiometer can be used, including a Cross-Component Gravity Gradiometer (CCGG), an Orthogonal Quadrupole Responder (OQR), an In-Line Responder (ILR), a Diagonal-Component Gravity Gradiometer, or a Multi-Component Gravity Gradiometer (MCGG).

37 Claims, 12 Drawing Sheets

(56) References Cited

OTHER PUBLICATIONS

Drinkwater, M. R., Floberghagen, R., Haagmans, R., Muzi, D., and Popescu, A., "GOCE: ESA's First Earth Explorer Core Mission", pp. 419-432, Space Science Reviews, Published 2003.

International Search Report and Written Opinion for International Patent Application No. PCT/CA2012/000149, dated Apr. 25, 2012.

Carroll, K.A., "Gravity Gradiometry for Lunar Surface Exploration", ASTRO 2010—15th CASI Canadian Astronautics Conference, Toronto, May 4-6, 2010.

Carroll, K.A., Hatch, D., and Main, B., "Performance of the Gedex High-Definition Gravity Gradiometer", in R.J.L. Lane (editor), Airborne Gravity 2010—Abstracts from the ASEG-PESA Airborne Gravity 2010 Workshop: Published jointly by Geoscience Australia and the Geological Survey of New South Wales, Geoscience Australia Record 2010/23 and GSNSW File GS2010/0457, pp. 37-43.

Floberghagen, R., Fehringer, M., Lamarre, D., Muzi, D., and Drinkwater, M., "The GOCE gradiometer—instrument status, data processing and product performance", American Geophysical Union, Fall Meeting 2009, abstract #G42A-03, San Francisco.

Hoffman, T.L., "GRAIL: Gravity Mapping the Moon", IEEE Aerospace Conference, paper #1626, Version 1, Updated Dec. 24, 2008.

Namiki, N., et al., "Farside Gravity Field of the Moon from Four-Way Doppler Measurements of SELENE (Kaguya)", pp. 899-905, Science, vol. 323, Feb. 13, 2009.

Hatch, D., Murphy, C., Mumaw, G., and Brewster, J., "Performance of the Air-FTG System aboard an airship platform", Preview (Australian Soc. of Exploration Geophysicists), Issue No. 127, Apr. 2007, pp. 17-22.

Carroll, K.A., Spencer, H., Arkani-Hamed, J., and Zee, R.E., "Lunette: An Affordable Canadian Lunar Farside Gravity Mapping Mission", 7th International Conference on the Exploration and Utilization of the Moon, Toronto, pp. 1-17, Sep. 2005.

Nabighian, M.N., Ander, M.E., Grauch, V.J.S., Hansen, R.O., Lafehr, T.R., Li, Y., Pearson, W.C., Peirce, J.W., Phillips, J.D., and Ruder, M.E., "Historical development of the gravity method in exploration", Geophysics, vol. 70, No. 6, Nov.-Dec. 2005, pp. 63-89.

Dodenhoff, K., "Traverse Gravimeter Experiment (TGE)", Lunar Surface Journal—Apollo 17, Sep. 18, 2006, http://history.nasa.gov/alsj/a17-TGE.html.

Spencer, H., Carroll, K.A., Arkani-Hamed, J., and Zee, R.E., "Lunette: Lunar Gravity Mapping With a Nanosatellite", ASTRO 2006—13th CASI Canadian Astronautics Conference, Montreal, Canada, Apr. 2006.

Van Kann, F.J., Buckingham, M.J., Dransfield, M.H., Edwards, C., Mann, A.G., Matthews, R., Penny, R.D., and Turner, P.J., "Laboratory Tests of a Mobile Superconducting Gravity Gradiometer", Physica B 165&166 (1990), pp. 93-94.

Forward, R.L., "Gravity Gradient Mapping From the Lunar Polar Orbiter—A Simulation Study", Earth, Moon and Planets, vol. 16, No. 1, Dec. 1976, pp. 3-26.

Forward, R.L., Lemmen, R.M., and Lowe, R.W., "Rotating Gravity Gradiometer Study", NASA CR-149800, Hughes Research Laboratories, Malibu, California, Jun. 30, 1976.

Miller, A.H., "Surveys With the Torsion Balance and the Magnetometer in Eastern Canada", The Journal of the Royal Astronomical Society of Canada, vol. XXVI, No. 1, Whole No. 210, Jan. 1932, pp. 1-16.

Forward, R.L., Bell, C.C., Morris, J.R., Richardson, J.M., Miller, L.R., and Berman, D., "Research on Gravitational Mass Sensors", Hughes Research Laboratories, Final Report on NASA Contract NASW-103, Oct. 15, 1964 through Apr. 15, 1966.

Shaw, H., and Lancaster-Jones, E., "The Eötvös Torsion Balance", Proc. Phys. Soc. London, vol. 35, No. 151, Nov. 10, 1922, pp. 151-166.

Lancaster-Jones, E., "The Principles and Practice of the Gravity Gradiometer", Part II, J. Sci. Instrum., The Science Museum, South Kensington, Jul. 14, 1932, pp. 373-380.

Lancaster-Jones, E., "The Principles and Practice of the Gravity Gradiometer", Part I, J. Sci. Instrum., The Science Museum, South Kensington, Jul. 14, 1932, pp. 341-353.

Bell, R.E., and Hansen, R.O., "The rise and fall of early oil field technology: The torsion balance gradiometer", The Leading Edge, Society of Exploration Geophysicists, vol. 17, No. 1, pp. 81-83, Jan. 1998.

Chapin, D.A., "Gravity measurements on the moon", The Leading Edge, Society of Exploration Geophysicists, vol. 19, No. 1, Jan. 2000, pp. 88-91.

Matthews, R., "Mobile Gravity Gradiometry", Ph.D. thesis, University of Western Australia, 2002.

Metzger, E.H., "Development experience of gravity gradiometer system", IEEE Position Location and Navigation Symposium 1982, PLANS 198, pp. 323-332.

Moody, M.V. & Paik, H.J., "A Superconducting Gravity Gradiometer for Inertial Navigation", Proc. 2004 IEEE Position, Location, and Navigation Symposium (PLANS), Monterey, California, Apr. 2004.

Hatch, D., "Evaluation of a full tensor gravity gradiometer for kimberlite exploration", in R.J.L. Lane, editor, Airborne Gravity 2004—Abstracts from the ASEG PESA Airborne Gravity 2004 Workshop: Geoscience Australia Record 2004/18, pp. 73-80.

Konopliv, A.S., Asmar, S.W., Carranza, E., Sjogren, W.L., & Yuan, D.N., "Recent Gravity Models as a Result of the Lunar Prospector Mission", Icarus, vol. 150, pp. 1-18, 2001.

Robertson, H., "A historic correspondence regarding the introduction of the torsion balance to the United States", The Leading Edge, Society of Exploration Geophysicists, pp. 652-654, 2000.

Hughes, P.C., "Spacecraft Attitude Dynamics", John Wiley & Sons, pp. 522-532, Toronto 1986.

* cited by examiner

GRAVITY GRADIOMETER AND METHODS FOR MEASURING GRAVITY GRADIENTS

PRIOR APPLICATION

This application claims the benefit of U.S. Provisional Patent Application No. 61/443,987 filed on Feb. 17, 2011 entitled "GRAVITY GRADIOMETER AND METHODS FOR MEASURING GRAVITY GRADIENTS", which is incorporated by reference herein in its entirety.

FIELD

Aspects of the inventions described here relate to gravity gradiometers and methods of measuring one or more components of a local gravity gradient tensor.

BACKGROUND

A gravity gradiometer is an instrument which is capable of measuring one or more components of the spatial gradient of the gravitational specific force vector.

As Sir Isaac Newton first showed in his *Philosophiæ Naturalis Principia Mathematica* (The Royal Society, London 1867), at every point in space there exists a vector field (the gravitational field) which exerts a force on any body located at that point which is proportional to the mass of that body. That force is a vector quantity, with three orthogonal components. Denoting the value of that vector at a location in space as $\underline{a}$, and denoting a reference frame A as $\mathcal{F}_A$ (using the vectrix notation from Appendix B of [Hughes, P. C., *Spacecraft Attitude Dynamics*, John Wiley & Sons, Toronto, 1986]), that vector can be expressed as a 3-element column vector by projecting it onto reference frame A, thusly:

$$a_A = \mathcal{F}_A \cdot \underline{a} \stackrel{\Delta}{=} \begin{bmatrix} a_{A_x} \\ a_{A_y} \\ a_{A_z} \end{bmatrix} \quad (1)$$

where, as shown in FIG. 1b, $\mathcal{F}_A$ has as its three orthogonal reference axes the unit vectors $\hat{\underline{A}}_x$, $\hat{\underline{A}}_y$ and $\hat{\underline{A}}_z$ (referred to here as the x, y and z axes of reference frame A), and $a_{A_x}$, $a_{A_y}$ and $a_{A_z}$ are the projections of the vector $\underline{a}$ onto those unit vectors.

The gravity gradient, which is the spatial gradient of the vector $\underline{a}$, is denoted here as $\underline{\underline{\Gamma}}$, and is a second-order tensor. This tensor can be projected onto reference frame $\mathcal{F}_A$ to form a 3×3 matrix $\Gamma_A$, thusly:

$$\Gamma_A = \mathcal{F}_A \cdot \underline{\underline{\Gamma}} \cdot \mathcal{F}_A^T \stackrel{\Delta}{=} \begin{bmatrix} \Gamma_{A_{xx}} & \Gamma_{A_{xy}} & \Gamma_{A_{xz}} \\ \Gamma_{A_{yx}} & \Gamma_{A_{yy}} & \Gamma_{A_{yz}} \\ \Gamma_{A_{zx}} & \Gamma_{A_{zy}} & \Gamma_{A_{zz}} \end{bmatrix} \quad (2)$$

where the elements of $\Gamma_A$ are the partial derivatives of $a_{A_x}$, $a_{A_y}$ and $a_{A_z}$ with respect to x, y and z. That is, $\Gamma_{A_{xx}} = \partial a_{A_x}/\partial x$, $\Gamma_{A_{xy}} = \partial a_{A_x}/\partial y$, $\Gamma_{A_{xz}} = \partial a_{A_x}/\partial z$, $\Gamma_{A_{yx}} = \partial a_{A_y}/\partial x$, $\Gamma_{A_{yy}} = \partial a_{A_y}/\partial y$, $\Gamma_{A_{yz}} = \partial a_{A_y}/\partial z$, $\Gamma_{A_{zx}} = \partial a_{A_z}/\partial x$, $\Gamma_{A_{zy}} = \partial a_{A_z}/\partial y$ and $\Gamma_{A_{zz}} = \partial a_{A_z}/\partial z$. Note that as a conservative field, two fundamental properties of that field are that the matrix $\Gamma_A$ is symmetric, that is, $\Gamma_{A_{xy}} = \Gamma_{A_{yx}}$, $\Gamma_{A_{xz}} = \Gamma_{A_{zx}}$ and $\Gamma_{A_{yz}} = \Gamma_{A_{zy}}$, and that it satisfies Laplace's equation, with the result that the trace of $\Gamma_A$ is equal to zero, i.e., $\Gamma_{A_{xx}} + \Gamma_{A_{yy}} + \Gamma_{A_{zz}} = 0$.

A gravity gradiometer is thus an instrument which, when oriented in a particular way relative to (for example) reference frame $\mathcal{F}_A$, measures one of the components of the matrix $\Gamma_A$, or some combination of the components of $\Gamma_A$. Gravity gradiometers of several different types have been developed, including the torsion balance of Eötvös (the first gravity gradiometer, which measures a combination of $\Gamma_{A_{xy}}$, $\Gamma_{A_{xx}} - \Gamma_{A_{yy}}$, $\Gamma_{A_{xz}}$ and $\Gamma_{A_{yz}}$), the gravity gradiometer of Lancaster-Jones (which measures a combination of $\Gamma_{A_{xz}}$ and $\Gamma_{A_{yz}}$), the rotating gravity gradiometer of Forward (which measures a combination of $\Gamma_{A_{xy}}$ and $\Gamma_{A_{xx}} - \Gamma_{A_{yy}}$, as described in de Bra, D. B., Harrison, J. C. & Muller, P. M., "A proposed Lunar orbiting gravity gradiometer experiment," The Moon, Volume 4, Issue 1-2, pp. 103-112), the rotating gravity gradiometer of Metzger (which measures a combination of $\Gamma_{A_{xy}}$ and $\Gamma_{A_{xx}} - \Gamma_{A_{yy}}$, as described in Metzger, E. H., "Development experience of gravity gradiometer system," IEEE Position Location and Navigation Symposium 1982, PLANS 198, pp. 323-332), the cryogenic orthogonal quadrupole responder gravity gradiometer of van Kann (which measures a combination of $\Gamma_{A_{xy}}$ and $\Gamma_{A_{xx}} - \Gamma_{A_{yy}}$, as described in Matthews, R., "Mobile Gravity Gradiometry," Ph. D. thesis, University of Western Australia, 2002), the cryogenic orthogonal quadrupole responder gravity gradiometer of Paik and Moody (which measures a combination of $\Gamma_{A_{xy}}$ and $\Gamma_{A_{xx}} - \Gamma_{A_{yy}}$), the GOCE satellite's electrostatically levitated gravity gradiometer of Touboul et al. (which measures combinations of all of the components of $\Gamma_A$, as described in Drinkwater, M. R., Flöberhagen, R. F., Haagmans, R., Muzi, D. & Popescu, A., "GOCE: ESA's First Earth Explorer Core Mission," Space Sci. Rev., Vol. 108, 2003, pp. 419-432), and the atom-interferometer gravity gradiometer of Kasevich (which measures $\Gamma_{A_{zz}}$, as described in McGuirk, J. M., Foster, G. T., Fixler, J. B., Snadden, M. J. & Kasevich, M. A., "Sensitive absolute-gravity gradiometry using atom interferometry," Phys. Rev. A, Vol. 65, 033608 (2002)).

BRIEF DESCRIPTION OF THE DRAWINGS

For a better understanding of the described example embodiments and to show more clearly how they may be carried into effect, reference will now be made, by way of example, to the accompanying drawings in which.

DETAILED DESCRIPTION OF VARIOUS EMBODIMENTS

Figure 1A:
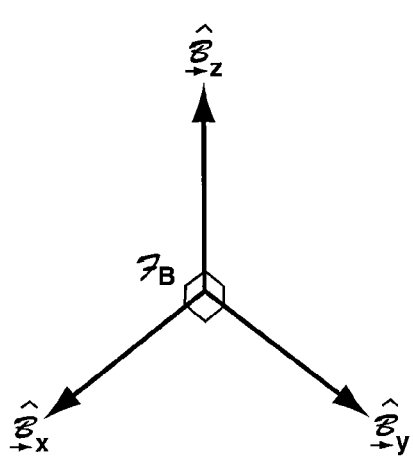
FIGS. 1A-C illustrate two reference frames A and B, where frame B is obtained by rotating an angle θ about the z-axis of frame A.
Figure 1B:
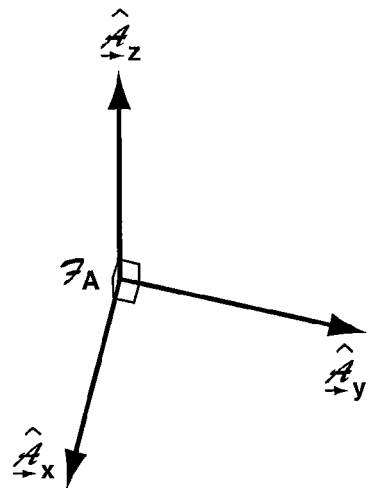

One application of gravity gradiometers is the original application pioneered by Eötvös more than a century ago, using a gravity gradiometer to conduct a ground-level geophysical survey. Past practice for such surveys using instruments such as that due to Eötvös (as described by Shaw, H. & Lancaster-Jones, E., "The Eötvös Torsion Balance," Proc. Phys. Soc. London, 1922, Vol. 35, pp. 151-166), and that due to Lancaster-Jones (Lancaster-Jones, E., "The Principles and Practice of the Gravity Gradiometer," J. Sci. Instrum., 1932, Vol. 9, pp. 341-353, and J. Sci. Instrum., 1932, Vol. 9, pp. 373-380), was to conduct such a survey by making a series of measurements at each survey location, with the gravity gradiometer in a different orientation for each measurement, the instrument being rotated about its vertical axis to transition from one measurement orientation to the next. The instrument was held in a static orientation for each measurement. These instruments are sensitive to several components of the gravity gradient tensor, with the relative sensitivity among the components depending on orientation. By making measurements in a carefully-chosen set of orientations at each location, the resulting set of measurements can be analyzed to determine the values of each of those gravity gradient components at that location. (Those skilled in the art will understand that a gravity gradiometer measures one or a combination of several components of a gravity gradient matrix which is the projection of a gravity gradient tensor onto some reference frame. For conciseness, the term "component of a gravity gradient tensor" will occasionally be used as a short form for the above terminology.)

Once the gravity gradient tensor components have been determined for each survey location, these can then be analyzed to infer the underground density distribution causing spatial variations in the field, from which knowledge details of the local geology (such as subsurface geological features) may be inferred. For this analysis to successfully identify the underground density distribution, the measurements made by the gravity gradiometer of the gravity gradient tensor components are preferably sufficiently accurate, or at least sufficiently repeatable. Accuracy refers to the difference between the actual quantity being measured (e.g., a particular gravity gradient tensor component) and the measurement reported by the instrument. Repeatability refers to the amount of variation in that instrument's measurements, when the instrument is used to measure the same quantity repeatedly (e.g., repeatedly measuring the same gravity gradient tensor component at the same location). Lack of repeatability results in variations in the gravity gradient tensor measurements in each survey location, which in the subsequent analysis stage may be interpreted erroneously as incorrect values of variation in underground density distribution; the amount of error in this interpretation will depend on the amount of error in the instrument's repeatability. (Some analysis and interpretation methods can compensate for measurement inaccuracy, so long as the measurements are sufficiently repeatable.)

Most gravity gradiometers, in common with most inertial instruments of other types (e.g., accelerometers, rate gyros, etc.), exhibit a bias error, which results in the instrument's measurement of a given quantity (e.g., a gravity gradient tensor component) to be offset from the actual value of the quantity being measured. Such a bias can typically be very large, compared to the magnitude of the quantity being measured. A bias may result in a level of measurement inaccuracy at least as large as the bias (contributions from other error sources can make the inaccuracy even larger than the bias). However, if the value of the bias is constant with respect to time, the bias will not affect the instrument's repeatability, as each measurement by the instrument will be offset by the same amount.

Some gravity gradiometers may exhibit an error that is like a bias error, in that the instrument's measurement of a given quantity is offset from the actual value of the quantity being measured, but is unlike a constant bias, in that the size of the offset varies with time. This behaviour is often referred to as a "drifting bias." The effect of a drifting bias is to reduce an instrument's repeatability, as multiple measurements made of the same quantity will vary with the amount that the bias has drifted in the time between the measurements.

If a gravity gradiometer was known to have a constant bias error, then it could be used to carry out a geophysical survey by simply making the minimum number of measurements (in different orientations) at each survey location needed to determine the gravity gradient tensor components of interest at each location; in principle, this could involve making as few as one measurement (in one orientation) at each survey location. Subsequent analysis and interpretation of these measurements could proceed successfully based on the assumption that the measurements were repeatable. However, if the gravity gradiometer exhibited a significantly large drift in its bias error, then this minimal set of measurements would not produce a useful survey result, as the lack of repeatability would result in an incorrect estimate of the underground density distribution.

Figure 1C:
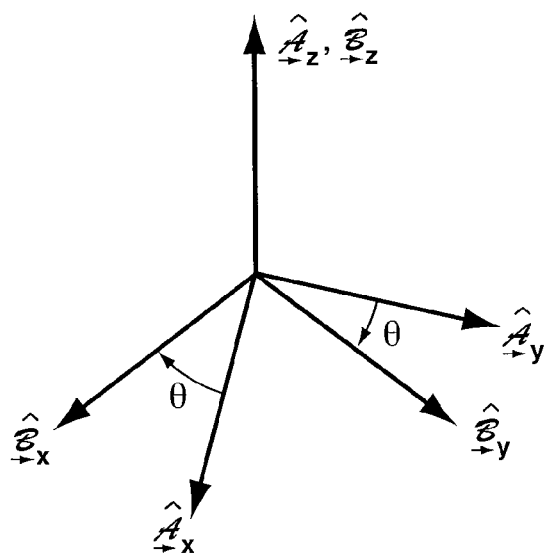
Figure 2:
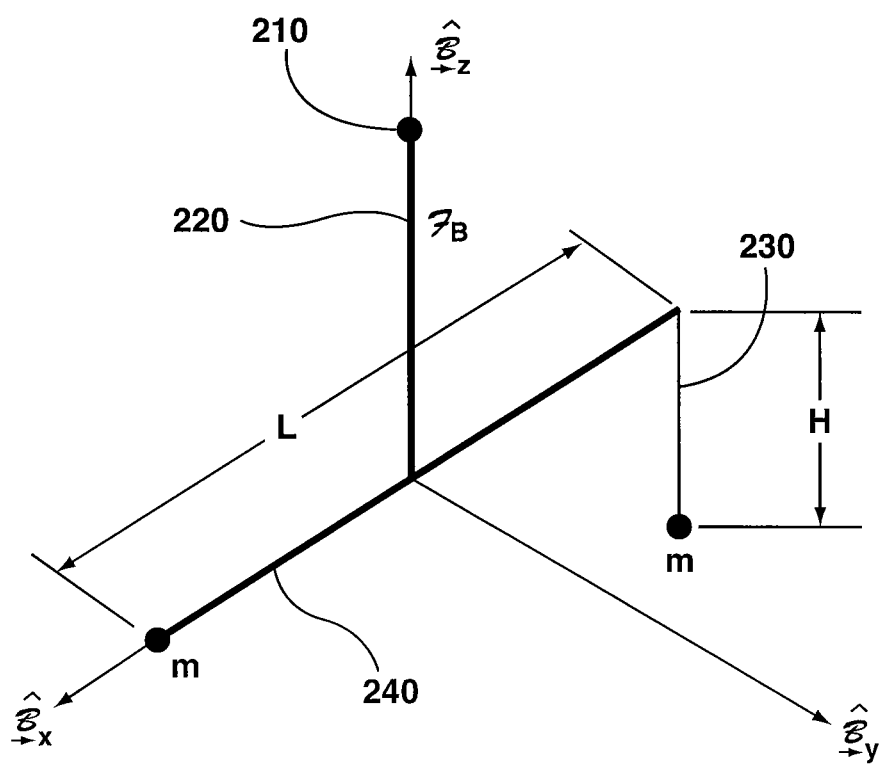
FIG. 2 is a schematic representation of an Eötvös torsion balance type gravity gradiometer.

This limitation was recognized by Eötvös, whose torsion balance instruments initially suffered from bias drift that was significantly large, over the time-scale of a geophysical survey involving measurements at numerous locations. He developed a technique for estimating the instrument's bias at each measurement location, assuming that the value of the bias did not change over the course of a set of measurements at a single survey location. His various torsion balance instruments were sensitive to the $\Gamma_{A_{xy}}$, $\Gamma_{A_{xx}} - \Gamma_{A_{yy}}$, $\Gamma_{A_{xz}}$ and $\Gamma_{A_{yz}}$ components of the gravity gradient tensor, in a reference frame in which the z axis is vertical and the x and y axes pointed in the local east and north direction. The measurement equation describing that sensitivity can be written as $$m(\theta) = b + k_{xy} \cos(2\theta) \Gamma_{A_{xy}} + k_{xx-yy} \sin(2\theta) (\Gamma_{A_{xx}} - \Gamma_{A_{yy}}) + k_{xz} \sin(\theta) \Gamma_{A_{xz}} + k_{yz} \cos(\theta) \Gamma_{A_{yz}} \quad (3)$$

where, as shown in FIG. 2, $\mathcal{F}_B$ is an instrument-fixed reference frame, $\mathcal{F}_A$ is a local Earth-fixed reference frame whose z-axis is vertical, and, as shown in FIG. 1c, $\mathcal{F}_B$ is found by rotating by an angle θ about the vertical axis from $\mathcal{F}_A$. Here, m(θ) is the nominal measurement of the instrument (including the effect of an assumed constant bias, but neglecting the effects of all other error sources) at an orientation angle θ, b is the value of the bias (assumed to be constant), and $k_{xy}$, $k_{xx-yy}$, $k_{xz}$ and $k_{yz}$ are constants defined by the specific construction of the instrument, which can be determined through one-time calibration measurements, and which do not generally change with time. (Note that in subsequent analyses presented below, similar measurement equations will be included for other types of instruments, each of these other types of instruments will have their own instrument-specific constants of proportionality equivalent to the $k_{xy}$, $k_{xx-yy}$, $k_{xz}$, and $k_{yz}$ used here. For clarity, the same symbols (e.g., $k_{xy}$, $k_{xx-yy}$) are used in the subsequent analyses, despite the fact that the actual values of $k_{xy}$, $k_{xx-yy}$, etc. for one specific gravity gradiometer will in general be different than the values of $k_{xy}$, $k_{xx-yy}$, etc. used for another specific gravity gradiometer.) It is apparent that $m(\theta)$ depends linearly on the values of b, $\Gamma_{A_{xy}}$, $\Gamma_{A_{xx}}-\Gamma_{A_{yy}}$, $\Gamma_{A_{xz}}$ and $\Gamma_{A_{yz}}$.

Eötvös' basic measurement technique was to determine these four unknown gravity gradient tensor components, plus the unknown value of the bias, by making a series of five measurements with the instrument in a different orientation for each measurement, rotating about the vertical axis to change between orientations. According to Lancaster-Jones (1923), Eötvös would typically choose five equally-spaced orientations, with $\theta_1=0°$, $\theta_2=72°$, $\theta_3=144°$, $\theta_4=216°$ and $\theta_5=288°$. This results in five linear equations in five unknowns:

$$m(\theta_1)=b+k_{xy}\cos(2\theta_1)\Gamma_{A_{xy}}+k_{xx-yy}\sin(2\theta_1)(\Gamma_{A_{xx}}-\Gamma_{A_{yy}})+k_{xz}\sin(\theta_1)\Gamma_{A_{xz}}+\cos(\theta_1)\Gamma_{A_{yz}} \quad (4a)$$

$$m(\theta_2)=b+k_{xy}\cos(2\theta_2)\Gamma_{A_{xy}}+k_{xx-yy}\sin(2\theta_2)(\Gamma_{A_{xx}}-\Gamma_{A_{yy}})+k_{xz}\sin(\theta_2)\Gamma_{A_{xz}}+k_{yz}\cos(\theta_2)\Gamma_{A_{yz}} \quad (4b)$$

$$m(\theta_3)=b+k_{xy}\cos(2\theta_3)\Gamma_{A_{xy}}+k_{xx-yy}\sin(2\theta_3)(\Gamma_{A_{xx}}-\Gamma_{A_{yy}})+k_{xz}\sin(\theta_3)\Gamma_{A_{xz}}+k_{yz}\cos(\theta_3)\Gamma_{A_{yz}} \quad (4c)$$

$$m(\theta_4)=b+k_{xy}\cos(2\theta_4)\Gamma_{A_{xy}}+k_{xx-yy}\sin(2\theta_4)(\Gamma_{A_{xx}}-\Gamma_{A_{yy}})+k_{xz}\sin(\theta_4)\Gamma_{A_{xz}}+k_{yz}\cos(\theta_4)\Gamma_{A_{yz}} \quad (4d)$$

$$m(\theta_5)=b+k_{xy}\cos(2\theta_5)\Gamma_{A_{xy}}+k_{xx-yy}\sin(2\theta_5)(\Gamma_{A_{xx}}-\Gamma_{A_{yy}})+k_{xz}\sin(\theta_5)\Gamma_{A_{xz}}+k_{yz}\cos(\theta_5)\Gamma_{A_{yz}} \quad (4e)$$

which can be re-written as a linear matrix equation thusly:

$$\begin{bmatrix} m(\theta_1) \\ m(\theta_2) \\ m(\theta_3) \\ m(\theta_4) \\ m(\theta_5) \end{bmatrix} = \begin{bmatrix} 1 & k_{xy}\cos(2\theta_1) & k_{xx-yy}\sin(2\theta_1) & k_{xz}\sin(\theta_1) & k_{yz}\cos(\theta_1) \\ 1 & k_{xy}\cos(2\theta_2) & k_{xx-yy}\sin(2\theta_2) & k_{xz}\sin(\theta_2) & k_{yz}\cos(\theta_2) \\ 1 & k_{xy}\cos(2\theta_3) & k_{xx-yy}\sin(2\theta_3) & k_{xz}\sin(\theta_3) & k_{yz}\cos(\theta_3) \\ 1 & k_{xy}\cos(2\theta_4) & k_{xx-yy}\sin(2\theta_4) & k_{xz}\sin(\theta_4) & k_{yz}\cos(\theta_4) \\ 1 & k_{xy}\cos(2\theta_5) & k_{xx-yy}\sin(2\theta_5) & k_{xz}\sin(\theta_5) & k_{yz}\cos(\theta_5) \end{bmatrix} \begin{bmatrix} b \\ \Gamma_{A_{xy}} \\ \Gamma_{A_{xx}}-\Gamma_{A_{yy}} \\ \Gamma_{A_{xz}} \\ \Gamma_{A_{yz}} \end{bmatrix} \quad (5)$$

which can be written more compactly as:

$$m=Ax \quad (6)$$

where m is the column matrix of the five measurements, x is the column matrix of the five unknown quantities, and A (the 5×5 matrix), referred to here as the observation matrix, contains in each of its elements expressions known to relate the measurements to the unknowns. If the observation matrix is non-singular, then the unknown quantities may then be determined by pre-multiplying the measurement column matrix by the inverse of the observation matrix:

$$x=A^{-1}m \quad (7)$$

The five values noted above for the $\theta_i$ are known to result in an invertible observation matrix for this instrument. Shaw and Lancaster-Jones note (in "Application of the Eötvös Torsion Balance to the Investigation of Local Gravitational Fields," Proc. Phys. Soc. London, 1922, Vol. 35, pp. 204-212) that by instead making six measurements using this instrument, at azimuth angles $\theta_i=0°$, 60°, 120°, 180°, 240°, 300°, the resulting 6×6 observation matrix has a simple closed-form solution.

The Gravity Gradiometer instrument described by Lancaster-Jones in his 1932 paper (op. cit.) is similar in many respects to the Eötvös torsion balance, although in one of its variations it differs in being sensitive only to the $\Gamma_{A_{xz}}$ and $\Gamma_{A_{yz}}$ components of the gravity gradient tensor, that sensitivity varying with instrument orientation in the same manner as for the Eötvös torsion balance. Lancaster-Jones' instrument exhibits the same type of bias as does the Eötvös instrument. Thus, for this version of the Lancaster-Jones instrument there are three unknowns (b, $\Gamma_{A_{xz}}$ and $\Gamma_{A_{yz}}$) to determine, these being related linearly to the instrument's measurements. These three unknowns can thus in principle be determined via making three measurements at each of a first, second, and third orientation, forming the corresponding 3×3 measurement equation, inverting that matrix, and pre-multiplying the column-matrix of measurements by that matrix inverse. While a 3×3 matrix is fairly easy to invert manually, Lancaster-Jones notes that if instead a set of four measurements are made, at azimuth angles $\theta_i=0°$, 90°, 180°, 270°, then solution for the three unknowns is particularly simple, viz.

$$b = \frac{1}{2}(m(0°)+m(180°)) = \frac{1}{2}(m(90°)+m(270°)) \quad (8)$$

$$\Gamma_{A_{xz}} = 0.63(m(270°)-m(90°))$$

$$\Gamma_{A_{yz}} = 0.63(m(180°)-m(0°))$$

Thus the Eötvös torsion balance instrument, and the Lancaster-Jones Gravity Gradiometer instrument, could be used to make measurements at survey locations that established not only the bias-corrected (i.e., absolute) values of several components of the local gravity gradient tensor at each location, but also the current value of the instrument's bias (under the assumption that the bias did not vary over the course of making the measurements at each location). Using this technique, these instruments were able to achieve a high degree of repeatability via achieving a high degree of accuracy, thus allowing geophysical surveys using these instruments to yield useful estimates of underground density distributions.

However, the accuracy (and hence repeatability) of these measurements could be limited by the assumption inherent in the techniques of Eötvös and Lancaster-Jones, that the instrument bias does not vary over the course of making the measurements at each location. Any such variation would introduce an additional term to the instrument's measurement equation which, if not accounted for, would result in the observation matrix failing to correctly relate the instrument measurements to the unknown gravity gradient tensor components and bias value.

Exemplary embodiments of the present invention provide an improved method for making and processing measurements using gravity gradiometers, which allows the effects of low-frequency measurement errors to be reduced or eliminated, including the effects of constant biases and biases which drift with respect to time in various ways. This method may be applied to all types of gravity gradiometer instruments.

Further exemplary embodiments of the present invention provide an apparatus to perform this method using several types of gravity gradiometer instruments.

In a broad aspect, there is provided methods of determining a bias-corrected value of at least one component of a gravity gradient tensor. The method comprises: using a gravity gradiometer positioned in a first orientation to take a first measurement of at least one component of the gravity gradient tensor, wherein the first measurement is taken at a first time; using the gravity gradiometer positioned in a second orientation to take a second measurement of at least one component of the gravity gradient tensor, wherein the second measurement is taken at a second time; using the gravity gradiometer to take a third measurement of at least one component of the gravity gradient tensor, wherein the third measurement is taken at a third time, wherein, for the third measurement, the gravity gradiometer is positioned in one of the first orientation, the second orientation, and a third orientation; determining a measurement bias of the gravity gradiometer based on the first, second, and third measurements, wherein the measurement bias varies with time; and determining the bias-corrected value of at least one component of the gravity gradient tensor based on the first, second and third measurements.

The gravity gradiometer may be: (i) held static in the first orientation when taking the first measurement, (ii) held static in the second orientation when taking the second measurement, and (iii) held static in one of the first, second, and third orientations when taking the third measurement.

In some embodiments, the third measurement is taken when the gravity gradiometer is in the third orientation.

In some embodiments, the measurement bias of the gravity gradiometer is determined based on an expected behaviour of the measurement bias of the gravity gradiometer with respect to time, and the expected behaviour is expressed as a function, wherein the function comprises at least one coefficient. In some embodiments, the function is a polynomial function.

In another broad aspect, determining the bias-corrected value of at least one component of the gravity gradient tensor further comprises: forming a measurement matrix comprising a row number equal to the number of measurements taken; forming a square invertible observation matrix comprising a number of observation matrix rows equal to the number of measurements taken and a number of observation matrix columns equal to a sum of: (i) a number of the bias-corrected values of the component of the gravity gradient tensor to be determined, and (ii) a number of the at least one coefficient; inverting the square invertible observation matrix to determine an inverted observation matrix; and determining a matrix product of the inverted observation matrix and the measurement matrix, wherein the matrix product comprises the bias-corrected value of at least one component of the gravity gradient tensor and a value for each of the at least one coefficient.

In another broad aspect, determining the bias-corrected value of at least one component of the gravity gradient tensor further comprises: forming a measurement matrix comprising a row number equal to the number of measurements taken; forming a rectangular observation matrix of full column rank comprising a number of observation matrix rows equal to the number of measurements taken and a number of observation matrix columns equal to a sum of: (i) a number of the bias-corrected values of a component of the gravity gradient tensor to be determined, and (ii) a number of the at least one coefficient; wherein the number of observation matrix rows is greater than the number of observation matrix columns; determining an inverted observation matrix by determining a left generalized inverse of the rectangular observation matrix; and determining a matrix product of the inverted observation matrix and the measurement matrix, wherein the matrix product comprises the bias-corrected value of at least one component of the gravity gradient tensor and a value for each of the at least one coefficient.

In some embodiments, the gravity gradiometer is a Cross-Component Gravity Gradiometer (CCGG), which may be an Orthogonal Quadrupole Responder (OQR) type gravity gradiometer or an In-Line Responder (ILR) type gravity gradiometer.

In some embodiments, the gravity gradiometer is sensitive to at least two components of the gravity gradient tensor in any selected reference frame. In some embodiments, the gravity gradiometer is a Multi-Component Gravity Gradiometer (MCGG) or a Diagonal-Component Gravity Gradiometer (DCGG).

In another broad aspect, the methods further comprise taking at least three measurements in each of a plurality of locations to identify at least one subsurface geological feature.

In some embodiments, the plurality of locations are located on a celestial body, which may include the Moon, an asteroid, or Mars.

In another broad aspect, the methods further comprise mounting the gravity gradiometer on a land vehicle to move the gravity gradiometer between the plurality of locations.

In another broad aspect, the methods further comprise mounting the gravity gradiometer on a submersible vehicle to move the gravity gradiometer between the plurality of locations, wherein the plurality of locations are under water.

In another broad aspect, the methods further comprise mounting the gravity gradiometer in a carrier to permit a person to carry the gravity gradiometer between the plurality of locations.

In another broad aspect, the methods further comprise mounting the gravity gradiometer on a down-hole vehicle to move the gravity gradiometer between the plurality of locations, wherein the plurality of locations are located under ground.

In another broad aspect, the methods further comprise mounting the gravity gradiometer on a down-mine vehicle to move the gravity gradiometers between the plurality of locations, wherein the plurality of locations are located in a mine.

In another broad aspect, the methods further comprise mounting the gravity gradiometer on a spacecraft to move the gravity gradiometer between the plurality of locations.

In another broad aspect, the methods further comprise mounting the gravity gradiometer on an aircraft to move the gravity gradiometer between the plurality of locations.

In another broad aspect, the methods further comprise performing steps (a)-(c) over a period of time for 4D reservoir monitoring.

In another broad aspect, there is provided systems for determining a bias-corrected value of at least one component of a gravity gradient tensor. The systems comprise: a gravity gradiometer; a gimbal adapted to rotate the gravity gradiometer into at least a first orientation and a second orientation; a control module for controlling the gimbal; a measurement module for (i) taking a measurement of at least one component of the gravity gradient tensor at a first time when the gravity gradiometer is in the first orientation, (ii) taking a second measurement of at least one component of the gravity gradient tensor at a second time when the gravity gradiometer is in the second orientation; and (iii) taking a third measurement of at least one component of the gravity gradient tensor at a third time when the gravity gradiometer is in one of the first orientation, the second orientation, and a third orientation; and a calculation module comprising a processor configured to determine: (i) a measurement bias of the gravity gradiometer based on the first, second, and third measurements, wherein the measurement bias varies with time, and (ii) the bias-corrected value of at least one component of the gravity gradient tensor based on the first, second, and third measurements.

In some embodiments, the apparatus comprises a multi-axis gimbal.

In some embodiments, the gravity gradiometer is a Cross-Component Gravity Gradiometer (CCGG), which may comprise an Orthogonal Quadrupole Responder (OQR) type gravity gradiometer or an In-Line Responder (ILR) type gravity gradiometer.

In some embodiments, the gravity gradiometer is one of a Diagonal-Component Gravity Gradiometer (DCGG) and a Multi-Component Gravity Gradiometer (MCGG).

In another broad aspect, the systems further comprise a vehicle to move the gravity gradiometer between a plurality of locations to identify at least one subsurface geological feature, wherein the gimbal is mounted on the vehicle. In some embodiments, the vehicle is one of a land vehicle, a submersible vehicle, a down-hole vehicle, a down-mine vehicle, an aircraft, and a spacecraft.

In another broad aspect, there is provided methods of determining a bias-corrected value of at least one component of a gravity gradient tensor. The methods comprise: using a gravity gradiometer positioned in a first orientation to take a first measurement of at least one component of the gravity gradient tensor, wherein the first measurement is taken at a first time, wherein the gravity gradiometer is one of an Orthogonal Quadrupole Responder (OQR) type and an In-Line Responder (ILR) type; using the gravity gradiometer positioned in a second orientation to take a second measurement of at least one component of the gravity gradient tensor, wherein the second measurement is taken at a second time; determining a measurement bias of the gravity gradiometer based on the first and second measurements, wherein the measurement bias is constant with respect to time; and determining the bias-corrected value of at least one component of the gravity gradient tensor based on the first and second measurements.

In some embodiments, the gravity gradiometer measures only one component of the gravity gradient tensor using only the first and second measurements. In some embodiments, the gravity gradiometer measures the $\Gamma_{B_{xy}}$ component of the gravity gradient tensor in a selected instrument-fixed reference frame $\mathcal{F}_B$, wherein the second orientation is rotated 90 degrees with respect to the first orientation. In some embodiments, the gravity gradiometer measures the $\Gamma_{B_{xz}}$ component of the gravity gradient tensor in a selected instrument-fixed reference frame $\mathcal{F}_B$, wherein the second orientation is rotated 180 degrees with respect to the first orientation.

Embodiments disclosed herein provide methods for compensating for bias drift errors, for any type of gravity gradiometer instrument, and apparatus with which to collect the measurements used in these methods. In order to aid in the understanding of the general methods, a specific embodiment is described below as an example of the general methods, extending Eötvös' method for using torsion balance instrument, to accommodate a particular type of time-varying measurement bias. More general methods follow.

Determining Bias Drift for an Eötvös Gravity Gradiometer where the Bias Varies Linearly with Time FIG. 2 is a schematic representation of an Eötvös torsion balance type gravity gradiometer, in which a uniform bar 240 of length L is suspended from its mid-point by a torsion wire 220, a mass m is attached to one end of the bar, and a second mass m is suspended from the other end of the bar by a wire 230 of length H. The torsion wire is attached at its top end 210 to a housing (not shown). The reference frame $\mathcal{F}_B$ is fixed to the housing. The assembly suspended by the torsion wire is arranged so that the bar is nominally oriented parallel to the x-axis of $\mathcal{F}_B$. If the projection of the local gravity gradient tensor onto reference frame $\mathcal{F}_B$ is $\Gamma_B$, then this gravity gradiometer would be sensitive to the $\Gamma_{B_{xy}}$ and $\Gamma_{B_{yz}}$ components of that tensor, making this a Multi-Component Gravity Gradiometer (MCGG).

Eötvös assumed that the measurement bias b in his torsion balance was a constant, at least over the course of making a set of 5 measurements at one location (for some versions of that instrument, those measurements took approximately 12 hours). Here we consider a model for the bias which includes a constant term, but also includes a term that varies linearly with time:

$$b = b_0 + b_1 t \qquad (9)$$

where $b_0$ is the unknown value of the constant bias term, t represents the amount of time since the beginning of the first measurement, and $b_1$ is the unknown value of the rate at which the bias increases with time. Using this model, the earlier measurement equation (3) is augmented thusly:

$$m(\theta) = b_0 + b_1 t + k_{xy} \cos(2\theta) \Gamma_{A_{xy}} + k_{xx-yy} \sin(2\theta)(\Gamma_{A_{xx}} - \Gamma_{A_{yy}}) + k_{xz} \sin(\theta) \Gamma_{A_{xz}} + k_{yz} \cos(\theta) \Gamma_{A_{yz}} \qquad (10)$$

This linear equation contains six unknown quantities, $b_0$, $b_1$, $\Gamma_{A_{xy}}$, $\Gamma_{A_{xx}} - \Gamma_{A_{yy}}$, $\Gamma_{A_{xz}}$ and $\Gamma_{A_{yz}}$, and thus six measurements at angles $\theta_i$, i=1, . . . 6 (rather than Eötvös' five measurements) and six measurement times $t_i$, i=1, . . . , 6 (where $t_i$ is the start-time for the $i^{th}$ measurement, with $t_1 \triangleq 0$) are needed to solve for these unknowns. This results in six measurement equations similar to those in equations (4a) to (4e), which can be written as a matrix equation thusly:

$$\begin{bmatrix} m(\theta_1) \\ m(\theta_2) \\ m(\theta_3) \\ m(\theta_4) \\ m(\theta_5) \\ m(\theta_6) \end{bmatrix} = \begin{bmatrix} 1 & t_1 & k_{xy}\cos(2\theta_1) & k_{xx-yy}\sin(2\theta_1) & k_{xz}\sin(\theta_1) & k_{yz}\cos(\theta_1) \\ 1 & t_2 & k_{xy}\cos(2\theta_2) & k_{xx-yy}\sin(2\theta_2) & k_{xz}\sin(\theta_2) & k_{yz}\cos(\theta_2) \\ 1 & t_3 & k_{xy}\cos(2\theta_3) & k_{xx-yy}\sin(2\theta_3) & k_{xz}\sin(\theta_3) & k_{yz}\cos(\theta_3) \\ 1 & t_4 & k_{xy}\cos(2\theta_4) & k_{xx-yy}\sin(2\theta_4) & k_{xz}\sin(\theta_4) & k_{yz}\cos(\theta_4) \\ 1 & t_5 & k_{xy}\cos(2\theta_5) & k_{xx-yy}\sin(2\theta_5) & k_{xz}\sin(\theta_5) & k_{yz}\cos(\theta_5) \\ 1 & t_6 & k_{xy}\cos(2\theta_6) & k_{xx-yy}\sin(2\theta_6) & k_{xz}\sin(\theta_6) & k_{yz}\cos(\theta_6) \end{bmatrix} \begin{bmatrix} b_0 \\ b_1 \\ \Gamma_{A_{xy}} \\ \Gamma_{A_{xx}} - \Gamma_{A_{yy}} \\ \Gamma_{A_{xz}} \\ \Gamma_{A_{yz}} \end{bmatrix} \qquad (11)$$

which as before can be written more compactly as m=Ax, and which can be solved for the six unknown values in the column-matrix x by pre-multiplying the measurement column-matrix by the inverse of the observation matrix, $x=A^{-1}m$. Note that this will work if the observation matrix A is invertible, which depends on the values chosen for the $\theta_i$ and the $t_i$. It can be shown that if the orientations $\theta_i=[0°, 60°, 120°, 180°, 240°, 300°]$ are used, and the measurements are taken at times that are equally spaced (e.g., $t_i=[0, 1, 2, 3, 4, 5]$ hours from the start time of the first measurement), then A is invertible. Thus, this is a suitable method for using the Eötvös torsion balance gravity gradiometer to determine bias-corrected values of the four components $\Gamma_{A_{xy}}$, $\Gamma_{A_{xx}}-\Gamma_{A_{yy}}$, $\Gamma_{A_{xz}}$ and $\Gamma_{A_{yz}}$ of the local gravity gradient tensor as projected onto reference frame $\mathcal{F}_A$, along with the two parameters $b_0$ and $b_1$ defining a time-varying bias assumed to be drifting linearly with time. If the instrument's bias was indeed varying linearly with respect to time over the course of the measurements, then using the method described in the above embodiment of the general method will generally result in a more accurate estimate of the gravity gradient components $\Gamma_{A_{xy}}$, $\Gamma_{A_{xx}}-\Gamma_{A_{yy}}$, $\Gamma_{A_{xz}}$ and $\Gamma_{A_{yz}}$, when compared with the results found using the original method of Eötvös.

Note that, while the above example uses equally-spaced orientation angles and equally-spaced observation start times, this method is not limited to doing so. The method applies to cases in which almost any set of orientation angles and measurement start times is used, subject only to the constraint that such sets must be chosen to result in an A matrix which has full column rank.

Determining Bias Drift for an Eötvös Gravity Gradiometer where the Bias Varies Non-Linearly with Time In another embodiment, more-general models of bias variation with respect to time may be considered. Any time-varying bias model which can be described in terms of coefficients multiplying functions of time (referred to here as basis functions) may be accommodated by this method. For example, a set of n+1 functions that are polynomial with respect to time may be used:

$$b=b_0+b_1t+b_2t^2+b_3t^3+\ldots+b_nt^n \quad (12)$$

in which case for the Eötvös torsion balance, the four gravity gradient components would be augmented by the n+1 bias-model coefficients in the column-matrix x, which would then have n+5 rows. In order to be able to solve for x, a total of n+5 measurements would need to be made, at angles $\theta_1$ through $\theta_{n+5}$, and at times $t_1=0$ through $t_{n+5}$. The orientations and measurement times should be chosen to ensure that the observation matrix A is invertible, so that $x=A^{-1}m$ can be determined.

The above embodiment uses polynomial basis functions with respect to time as a convenient illustrative example. It will be apparent to one skilled in the art that further generalizations are possible along similar lines, by making use of other types of basis functions with respect to time than the polynomial functions shown here. For example, trigonometric functions might be used, or exponential functions, or piecewise polynomial functions, or combinations of these. The scope of the methods disclosed herein is not intended to be restricted to the types of basis functions recited here, but extends to all suitable functions with respect to time.

Determining Bias Drift for an Eötvös Gravity Gradiometer Using a Rectangular Observation Matrix The above embodiments involve making exactly the number of measurements with the instrument as are needed to produce an observation matrix A that is square; that is the number of measurements is equal to the number of columns in the x column matrix. However, it is known that each of the measurements will contain, in addition to the effects described above, errors from other sources which have not yet been described. It is a primary goal of the developer of any such gravity gradiometer instrument to minimize the magnitude of such errors, but they cannot generally be made zero. The effect of these errors will be to render somewhat inaccurate the estimates of $\Gamma_{A_{xy}}$, $\Gamma_{A_{xx}}-\Gamma_{A_{yy}}$, $\Gamma_{A_{xz}}$ and $\Gamma_{A_{yz}}$ using the aforementioned methods.

One technique for improving accuracy, in the general field of making measurements using instruments, is to make multiple measurements and average their results. This technique is applied here in another embodiment. In this embodiment, the number of measurements made with the instrument is chosen to be larger than the number of columns in the x column matrix, resulting in an observation matrix A that is rectangular, with more columns than rows. The orientations and observation times are chosen to ensure that the columns of A are linearly independent of each other, so that A has full column rank. In that case, the left generalized inverse of A (i.e., $(A^TA)^{-1}A^T$) will exist, and the values in the column matrix x, comprising the local gravity gradient tensor components projected onto $\mathcal{F}_A$ and the coefficients defining the drifting bias, are determined by calculating $x=(A^TA)^{-1}A^Tm$.

Determining Bias Drift for any Gravity Gradiometer where the Bias Varies With Time The methods described above may be applied to other types of gravity gradiometer instruments. One example of this method is to make a set of static measurements using any type of gravity gradiometer, in a set of measurement orientations chosen based on the type of gravity gradiometer and the expected behaviour of the instrument's bias with respect to time. A corresponding observation matrix A is then formed. Then, depending on the number of measurements taken, either the inverse or the left generalized inverse of A is used to premultiply the measurement column matrix m, resulting in the column matrix x which contains estimates of various gravity gradient components, and of parameters of the bias model. In more detail, the method can be generalized as follows:

For a given type of gravity gradiometer instrument, determine the instrument's measurement equation with respect to the components of the local gravity gradient tensor as projected onto an instrument-fixed reference frame $\mathcal{F}_B$;

Define a reference frame $\mathcal{F}_A$, for which some components of the projection of the local gravity gradient tensor onto $\mathcal{F}_A$ are to be determined;

Assume a model for the time-dependence of the measurement bias of the instrument, in terms of a set of functions of time, each multiplied by a coefficient;

Select a set of orientations including at least a first orientation and a second orientation into which to rotate the instrument in order to make measurements, with the total number of measurements $n_m$ chosen to be equal to or greater than $n_x$ (as defined below), and the orientations chosen to ensure that the observation matrix A (as defined below) has full column rank;

Use the instrument to make measurements in each of those $n_m$ orientations (including at least the first orientation and the second orientation)—the instrument is preferably held static for some amount of time during each measurement—and compile those measurements into a measurement column-matrix m;

Determine the instrument's measurement equations with respect to the components of the local gravity gradient tensor as projected onto $\mathcal{F}_A$, with the instrument rotated into each of the reference frames defined by those measurement orientations;

Augment the measurement equation for each orientation with terms defining the assumed time-dependence of the instrument's measurement bias;

Define a column-matrix x of to-be-determined bias-corrected values, comprising the components of the local gravity gradient tensor as projected onto $\mathcal{F}_A$ that appear in the measurement equations, as well as the coefficients which multiply the time-dependent functions in the bias error model, and define the total number of rows in x to be $n_x$;

Construct an observation matrix A, each of whose $n_m$ rows comprises the coefficients of the observation equation for one of the measurement orientations, with one column for each of the $n_x$ values in the column-matrix x;

If $n_m = n_x$ then the observation matrix A will be square. As the measurement orientations will have been chosen to make A of full rank, A will be a square invertible observation matrix, and so its inverted observation matrix $A^{-1}$ will exist. In this case, determine the bias-corrected values of the local gravity gradient tensor components projected onto $\mathcal{F}_A$ and the coefficients defining the drifting bias, which are the elements of x, by determining a matrix product of the inverted observation matrix and the measurement matrix (i.e. calculating $x = A^{-1}m$).

Alternatively, if $n_m > n_x$, then observation matrix A will be rectangular, with $n_m$ rows and $n_x$ columns. As the measurement orientations will have been chosen to make A of full column rank, the left generalized inverse of A (i.e., inverted observation matrix $(A^T A)^{-1} A^T$) will exist. In this case, determine the bias-corrected values of the local gravity gradient tensor components projected onto $\mathcal{F}_A$ and the coefficients defining the drifting bias, which are the elements of x, by determining a matrix product of the inverted observation matrix and the measurement matrix (i.e. calculating $x = (A^T A)^{-1} A^T m$).

It will be understood by one skilled in the art that these steps need not be carried out in the sequence shown. In some embodiments, iteration of one or more of these steps may be needed. For example, determining the number of measurements to be taken—and the orientations and times of those measurements—may involve repeatedly forming trial values of the A matrix based on trial values of those quantities, and evaluating the invertibility of A and/or of its left generalized inverse. Similar iteration may involve varying the assumed basis functions for the drifting bias. In some embodiments, not all of the steps may be performed.

Additional embodiments are provided below, describing specific applications of this method to types of gravity gradiometers other than the Eötvös torsion balance and the Lancaster-Jones Gravity Gradiometer.

Examples of Embodiments for Determining Bias Drift Using Specific Types of Gravity Gradiometers As noted above, the projection of the local gravity gradient tensor onto any particular reference frame results in a 3×3 gravity gradient matrix, as shown in equation (2). Various different designs of gravity gradiometers have been developed, each one of them being sensitive to one or more of the elements of a gravity-gradient matrix that is associated with an instrument-fixed reference frame. For example, consider an instrument-fixed reference frame $\mathcal{F}_B$, which results in a gravity gradient matrix $\Gamma_B$ when the local gravity gradient tensor is projected onto it. $\Gamma_B$ has three diagonal elements ($\Gamma_{B_{xx}}, \Gamma_{B_{yy}}$ and $\Gamma_{B_{zz}}$), and six off-diagonal elements ($\Gamma_{B_{xy}} = \Gamma_{B_{yx}}$, $\Gamma_{B_{xz}} = \Gamma_{B_{zx}}$ and $\Gamma_{B_{yz}} = \Gamma_{B_{zy}}$). Some types of gravity gradiometers are designed such that there exists an instrument-fixed reference frame $\mathcal{F}_B$ such that the instrument is only sensitive to one of the off-diagonal elements of $\Gamma_B$. These types of gravity gradiometers are referred to herein as Cross-Component Gravity Gradiometers (CCGGs). Other types of gravity gradiometers are designed such that there exists an instrument-fixed reference frame $\mathcal{F}_B$ such that the instrument is only sensitive to one of the diagonal elements of $\Gamma_B$. Those instruments are referred to herein as Diagonal-Component Gravity Gradiometers (DCGGs). All other types of gravity gradiometers referred to herein as Mixed-Component Gravity Gradiometers (MCGGs), as in all instrument-fixed reference frames $\mathcal{F}_B$ they respond to more than one component of $\Gamma_B$.

Figure 3:
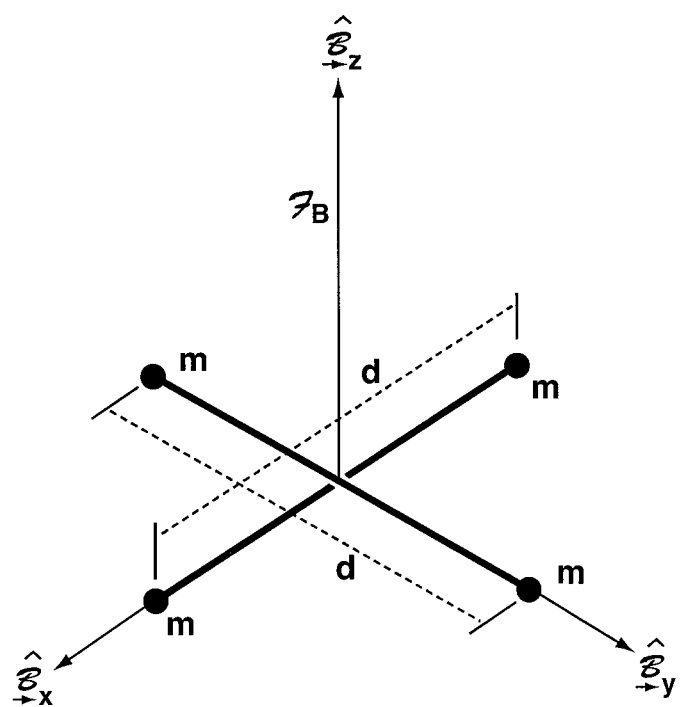
FIG. 3 is a schematic representation of an Orthogonal Quadrupole Responder (OQR) type gravity gradiometer.

There are several types of CCGG designs which are designed to respond to the $\Gamma_{B_{xy}}$ component of $\Gamma_B$ in a particular instrument-fixed reference frame $\mathcal{F}_B$. One of these is the Orthogonal Quadrupole Responder (OQR) type of gravity gradiometer, examples of which are described in U.S. Pat. No. 7,305,879 (to Vol Moody et al.), A Superconducting Gravity Gradiometer for Inertial Navigation (M. V. Moody and H. J. Paik, IEEE Position Location and Navigation Symposium, 2004, PLANS 2004, 26-29 Apr. 2004, pp. 775-781), and U.S. Pat. No. 7,360,419 (to French et al.), which are each incorporated by reference herein in their entirety. This type of instrument includes a pair of "mass-quadrupoles", which are test-mass bodies suspended from a common housing by torsional-flexure springs, with those quadrupole responders generally arranged to have their long axes orthogonal to each other, and their flexure axes collinear. FIG. 3 is a schematic diagram of an OQR gravity gradiometer's two mass-quadrupoles, each shown there as a pair of masses m mounted a distance d apart to a bar. In this Figure, the housing and the springs are not illustrated. In the reference frame $\mathcal{F}_B$ shown, the only component of the gravity gradient matrix $\Gamma_B$ to affect the instrument is the $\Gamma_{B_{xy}}$ component, which causes torques which tend to produce a "scissoring" action of the mass-quadrupoles (i.e., the two mass-quadrupoles rotating in opposite directions) in the x-y plane, the scissor-angle being proportional to $\Gamma_{B_{xy}}$. If the projection of the local gravity gradient tensor onto reference frame $\mathcal{F}_B$ is $\Gamma_B$, then this gravity gradiometer would be sensitive to the $\Gamma_{B_{xy}}$ component of that tensor, making this a Cross-Component Gravity Gradiometer (CCGG).

Another of this type of CCGG is a particular type within the class of In-Line Responder (ILR) gravity gradiometers. An ILR gravity gradiometer comprises a pair of translational accelerometers which are both mounted some distance apart from each other to a connecting structure. Each accelerometer has a sensitive axis; the accelerometer responds with a signal to translational accelerations along that axis, but not to accelerations in directions perpendicular to that axis. In an ILR, the sensitive axes of the translational accelerometers are parallel. The "Line" in ILR refers to the line between the locations of the two accelerometers. ILRs can be configured to be sensitive to any one element of a gravity gradient matrix, or to a combination of elements, depending on the orientation of the sensitive axes with respect to that line.

Figure 4:
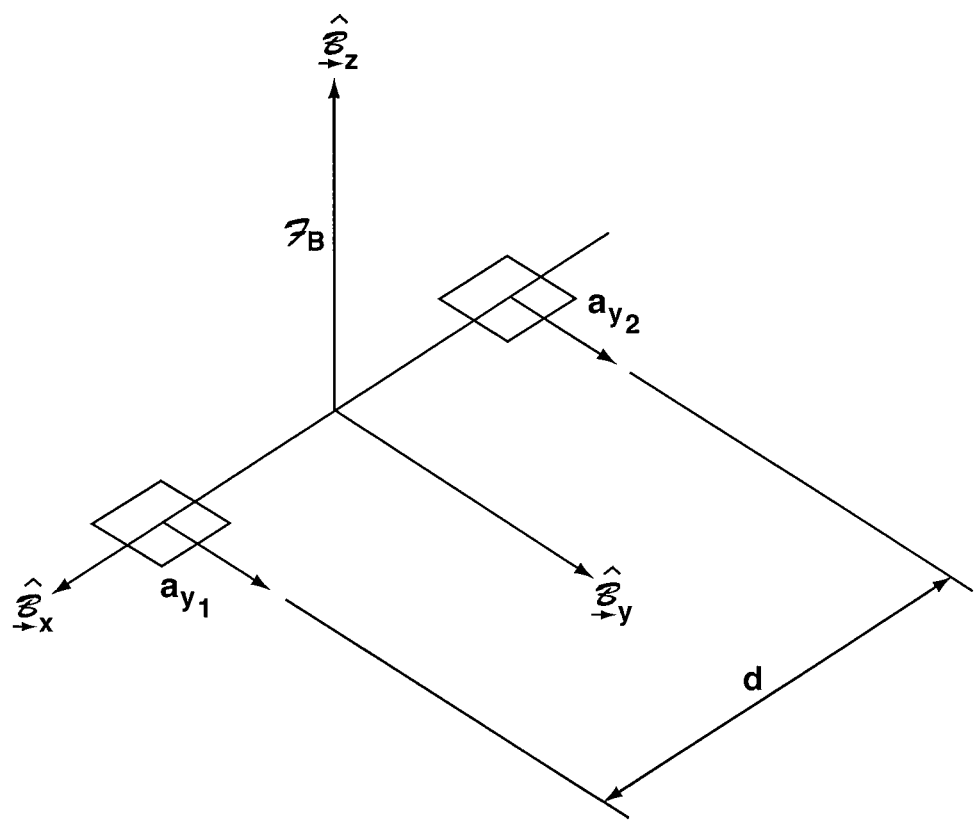
FIG. 4 is a schematic representation of an In-Line Responder (ILR) type gravity gradiometer.

FIG. 4 is a schematic diagram of an ILR configured to be sensitive to the $\Gamma_{B\,xy}$ component of the $\Gamma_B$ gravity gradient matrix, with respect to the reference frame $\mathcal{F}_B$ shown. Its pair of translational accelerometers $a_{y1}$ and $a_{y2}$ are mounted to a bar so as to have their sensitive axes oriented parallel to the y-axis of $\mathcal{F}_B$. The bar, which is shown to lie along the line joining the accelerometers, is aligned along the x-axis of $\mathcal{F}_B$. The accelerometers are oriented to be sensitive to translational accelerations in the direction of the y-axis of $\mathcal{F}_B$. That is, the difference between the acceleration signals produced by the accelerometers is proportional to $\Gamma_{B_{xy}}$. If the local gravity gradient tensor is $\Gamma_B$, then this gravity gradiometer would be sensitive to the $\Gamma_{B_{xy}}$ component of that tensor, making this a Cross-Component Gravity Gradiometer (CCGG).

Figure 5:
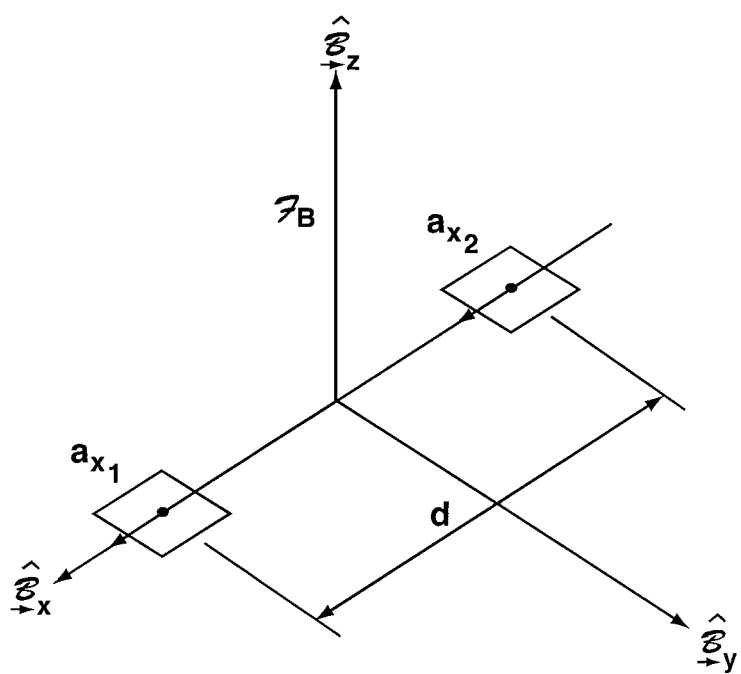
FIG. 5 is another schematic representation of an In-Line Responder (ILR) type gravity gradiometer.

FIG. 5 is a schematic representation of an In-Line Responder (ILR) type gravity gradiometer, in which a pair of translational accelerometers $a_{x1}$ and $a_{x2}$ are connected to each other by a bar, with each accelerometer being located on the x-axis of reference frame $\mathcal{F}_B$. The accelerometers are oriented to be sensitive to translational accelerations in the direction of the x-axis of $\mathcal{F}_B$. If the local gravity gradient tensor is $\Gamma_B$, then this gravity gradiometer would be sensitive to the $\Gamma_{B_{xx}}$ component of that tensor, making this a Diagonal-Component Gravity Gradiometer (DCGG).

Figure 6:
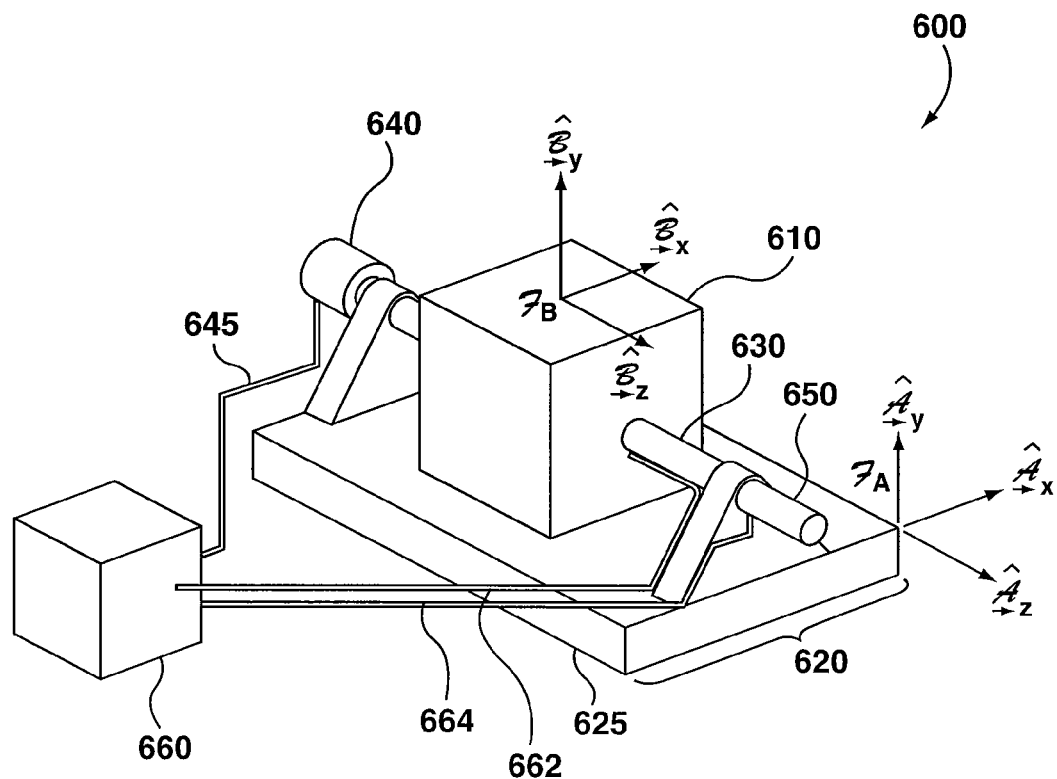
FIG. 6 is an example embodiment of an instrument assembly comprising a gravity gradiometer mounted within a one-axis gimbal mechanism.

In another embodiment of the general method described above, such a CCGG (e.g., an OQR or suitable ILR) that is sensitive to the $\Gamma_{B_{xy}}$ component of $\Gamma_B$ in some instrument-fixed reference frame $\mathcal{F}_B$, and which is mounted in a one-axis gimbal such as the one shown in FIG. 6, can be used to determine two components of the gravity gradient tensor by rotating it about its z-axis. FIG. 6 is an example embodiment of an instrument system 600 comprising a gravity gradiometer 610 mounted on an axle 630 within a one-axis gimbal 620, which is designed to rotate the gravity gradiometer 610 about the z-axis of the gravity gradiometer fixed reference frame $\mathcal{F}_B$, which is also the z-axis of the reference frame $\mathcal{F}_A$ which is fixed to the stationary base of the gimbal. Also shown in FIG. 6 are a motor 640 to drive the gimbal mechanism, an angle sensor 650 to measure the orientation of the gravity gradiometer, electronics 660 to control the gimbal mechanism and read-out the measurements from gravity gradiometer, and control cables 645 and signal cables 662, 664. The electronics 660 may include a processor (not shown) and computer readable storage media (not shown) with instructions stored thereon to instruct the processor to reorient the gravity gradiometer using the gimbal motors and record measurement data from the gravity gradiometer and gimbal angle sensors. The control cables 645 permit the processor to control the motor 640. The gradiometer signal cables 662 permit the processor to read measurement signals from the gravity gradiometer 610. The gimbal sensor cables 664 transmit data from the gimbal angle sensor 650 to the electronics 660. The basic measurement equation for this type of instrument is:

$$m(\theta) = b + k_{xy}\cos(2\theta)\Gamma_{A_{xy}} + k_{xx-yy}\sin(2\theta)(\Gamma_{A_{xx}} - \Gamma_{A_{yy}}) \quad (13)$$

assuming a constant bias b. (This equation is found by noting that $\Gamma_B = C_{AB}^T \Gamma_A C_{AB}$, where $$C_{AB} = \begin{bmatrix} \cos(\theta) & \sin(\theta) & 0 \\ -\sin(\theta) & \cos(\theta) & 0 \\ 0 & 0 & 1 \end{bmatrix}$$

is the rotation matrix which transforms from $\mathcal{F}_B$ to $\mathcal{F}_A$, where θ represents a rotation angle (referred to here as the azimuth angle) about the z-axis of the two reference frames, as shown in FIG. 1c.) With three unknown quantities to solve for (b, $\Gamma_{A_{xy}}$ and $\Gamma_{A_{xx}} - \Gamma_{A_{yy}}$), at least three measurements $m(\theta_1)$, $m(\theta_2)$ and $m(\theta_3)$ are needed at three azimuth angles $\theta_1$, $\theta_2$ and $\theta_3$, resulting in a set of measurements equations m=Ax:

$$\begin{bmatrix} m(\theta_1) \\ m(\theta_2) \\ m(\theta_3) \end{bmatrix} = \begin{bmatrix} 1 & k_{xy}\cos(2\theta_1) & k_{xx-yy}\sin(2\theta_1) \\ 1 & k_{xy}\cos(2\theta_2) & k_{xx-yy}\sin(2\theta_2) \\ 1 & k_{xy}\cos(2\theta_3) & k_{xx-yy}\sin(2\theta_3) \end{bmatrix} \begin{bmatrix} b \\ \Gamma_{A_{xy}} \\ \Gamma_{A_{xx}} - \Gamma_{A_{yy}} \end{bmatrix} \quad (14)$$

Figure 7A:
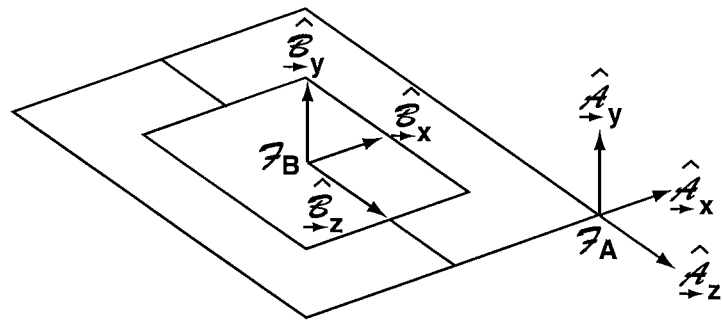
FIGS. 7A-C are a schematic representation of the one-axis gimbal mechanism of FIG. 6, showing its rotating mechanism in several orientations with respect to its base.
Figure 7B:
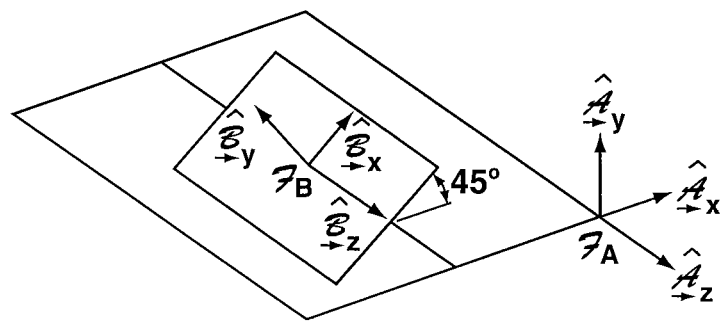
Figure 7C:
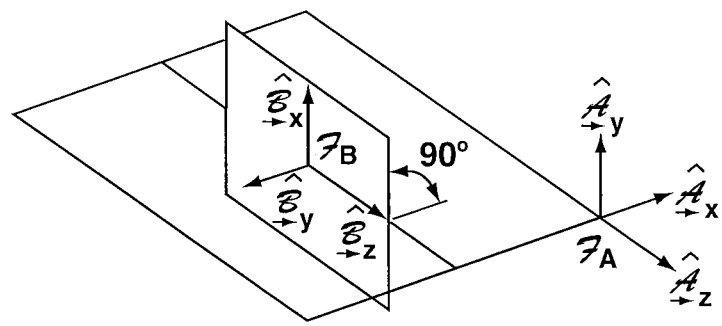

It can be shown that for the set of azimuth angles $\theta_i = 0°$, 45°, 90° (e.g. as shown in FIG. 7), the matrix is invertible (as it is for almost all set of angles), so that the quantities b, $\Gamma_{A_{xy}}$ and $\Gamma_{A_{xx}} - \Gamma_{A_{yy}}$ can be found by calculating $x = A^{-1}m$.

In another embodiment, the same type of CCGG (ILR or OQR) that is sensitive to $\Gamma_{B_{xy}}$ can be used to determine $\Gamma_{A_{xy}}$ and $\Gamma_{A_{xx}} - \Gamma_{A_{yy}}$ using an instrument whose bias drifts linearly with time. Assume a bias model $b = b_0 + b_1 t$, in which case there are four unknown quantities to solve for ($b_0$, $b_1$, $\Gamma_{A_{xy}}$ and $\Gamma_{A_{xx}} - \Gamma_{A_{yy}}$), so at least four measurements $m(\theta_1)$, $m(\theta_2)$ $m(\theta_3)$ and $m(\theta_4)$ are needed at four azimuth angles $\theta_1$, $\theta_2$, $\theta_3$ and $\theta_4$, at measurement start times $t_1$, $t_2$, $t_3$ and $t_4$. In this case, an additional, redundant measurement will be included, $m(\theta_5)$, resulting in a set of measurements equations m=Ax:

$$\begin{bmatrix} m(\theta_1) \\ m(\theta_2) \\ m(\theta_3) \\ m(\theta_4) \\ m(\theta_5) \end{bmatrix} = \begin{bmatrix} 1 & t_1 & k_{xy}\cos(2\theta_1) & k_{xx-yy}\sin(2\theta_1) \\ 1 & t_2 & k_{xy}\cos(2\theta_2) & k_{xx-yy}\sin(2\theta_2) \\ 1 & t_3 & k_{xy}\cos(2\theta_3) & k_{xx-yy}\sin(2\theta_3) \\ 1 & t_4 & k_{xy}\cos(2\theta_4) & k_{xx-yy}\sin(2\theta_4) \\ 1 & t_5 & k_{xy}\cos(2\theta_5) & k_{xx-yy}\sin(2\theta_5) \end{bmatrix} \begin{bmatrix} b_0 \\ b_1 \\ \Gamma_{A_{xy}} \\ \Gamma_{A_{xx}} - \Gamma_{A_{yy}} \end{bmatrix} \quad (15)$$

It can be shown that (for example) for the set of azimuth angles $\theta_1 = 0°$, 30°, 60°, 90°, 120°, and for the measurements are taken at times that are equally spaced (e.g., $t_1 = [0, 1, 2, 3, 4]$ minutes from the start time of the first measurement), the matrix A has full column rank, and so the matrix $A^T A$ is invertible (as it is for almost all sets of angles and measurement times), so that the quantities $b_0$, $b_1$, $\Gamma_{A_{xy}}$ and $\Gamma_{A_{xx}} - \Gamma_{A_{yy}}$ can be found by calculating $x = (A^T A)^{-1} A^T m$.

In another embodiment, the same type of CCGG (ILR or OQR) can be used to solve just for b and $\Gamma_{A_{xy}}$, by using the two azimuth angles $\theta_i = 0°$, 90°. In this case, the bias is found to be one-half the sum of the two measurements ($b = (m(\theta_1) + m(\theta_2))/2$), and $\Gamma_{A_{xy}}$ is found to be one-half the difference between the two measurements ($b = (m(\theta_1) - m(\theta_2))/2$).

In another embodiment, the same type of CCGG (ILR or OQR) that is sensitive to $\Gamma_{B_{xy}}$ can be used to find all of the components of $\Gamma_A$, and hence the entire local gravity gradient tensor, given a gravity gradiometer that has a constant bias b. This involves being able to reorient the instrument about more than one axis.

The embodiments discussed above with respect to FIGS. 6 and 7 show how to use such a gravity gradiometer mounted in a one-axis gimbal in order to determine the instrument's bias plus the $\Gamma_{A_{xy}}$ and $\Gamma_{A_{xx}} - \Gamma_{A_{yy}}$ components of the gravity gradient tensor $\Gamma_A$. The same can be accomplished by such a gravity gradiometer that is mounted in a multi-axis gimbal, such as the three-axis gimbal shown in FIG. 8, by rotating the instrument about the inner gimbal axis (thus rotating the instrument about its own x-axis).

Figure 8:
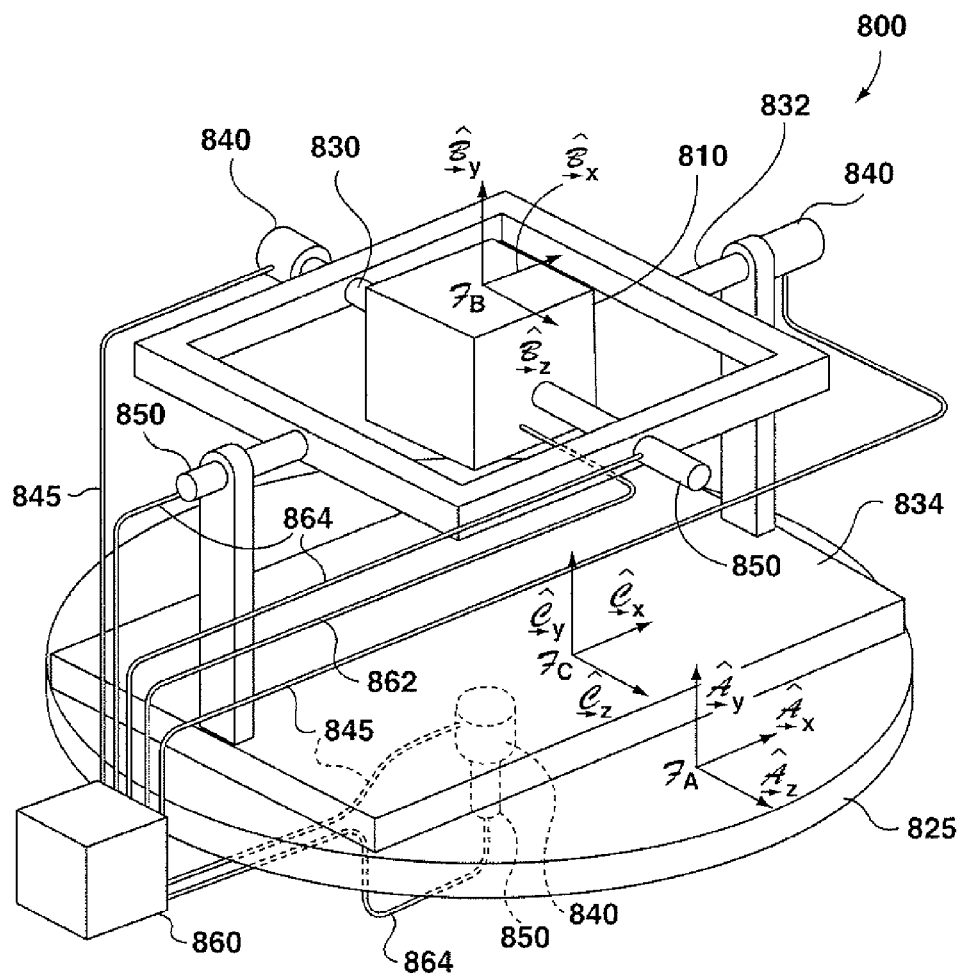
FIG. 8 is an example embodiment of an instrument assembly comprising a gravity gradiometer mounted within a three-axis gimbal mechanism.

FIG. 8 is an example embodiment of an instrument system 800 comprising a gravity gradiometer 810 mounted within a three-axis gimbal mechanism, which is designed to rotate the gravity gradiometer about the z-axis of the gravity gradiometer fixed reference frame $\mathcal{F}_B$, and independently about the y-axis of the reference frame $\mathcal{F}_A$ which is fixed to the stationary base of the gimbal, and the x-axis axis of the intermediate reference frame ($\mathcal{F}_C$). Also shown in FIG. 8 are three motors 840 to drive the gimbal mechanisms, three angle sensors 850 to measure those motions, electronics 860 to control the gimbal mechanisms and read-out the gravity gradiometer, and control cables 845 and signal cables 862, 864. The electronics 860 may include a processor (not shown) and computer readable storage media (not shown) with instructions stored thereon to instruct the processor to reorient the gravity gradiometer using the gimbal motors and record measurement data from the gravity gradiometer and gimbal angle sensors. The control cables 845 permit the processor to control the motors 840. The gradiometer signal cables 862 permit the processor to read measurement signals from the gravity gradiometer 810. The gimbal sensor cables 864 transmit data from the gimbal angle sensors 850 to the electronics 860.

Figure 9A:
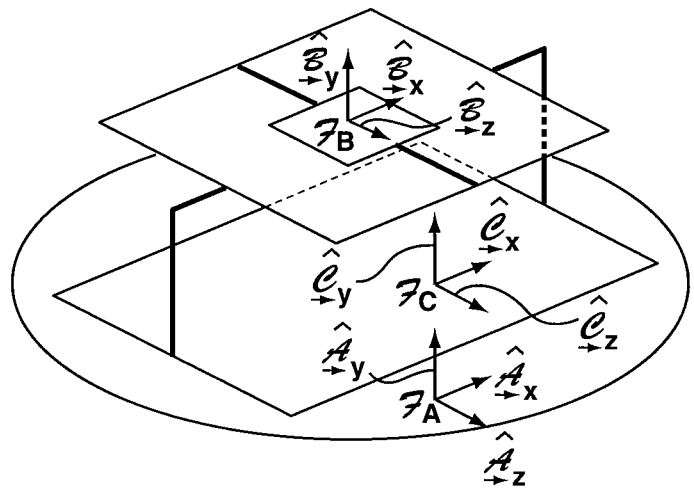
FIGS. 9A-C are a schematic representation of the three-axis gimbal mechanism of FIG. 8, showing its rotating mechanisms in several orientations.
Figure 9B:
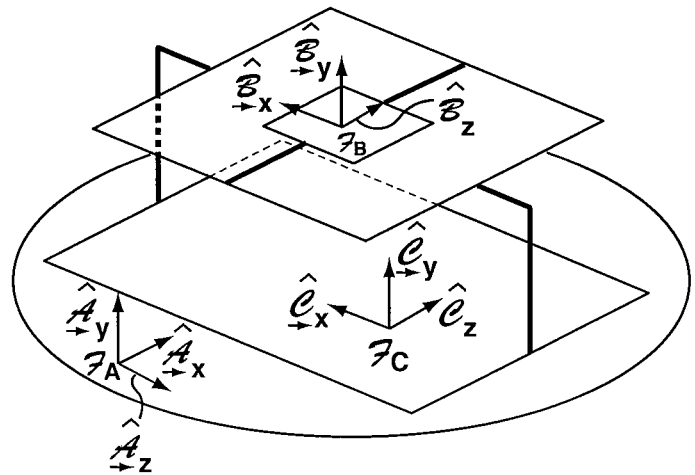
Figure 9C:
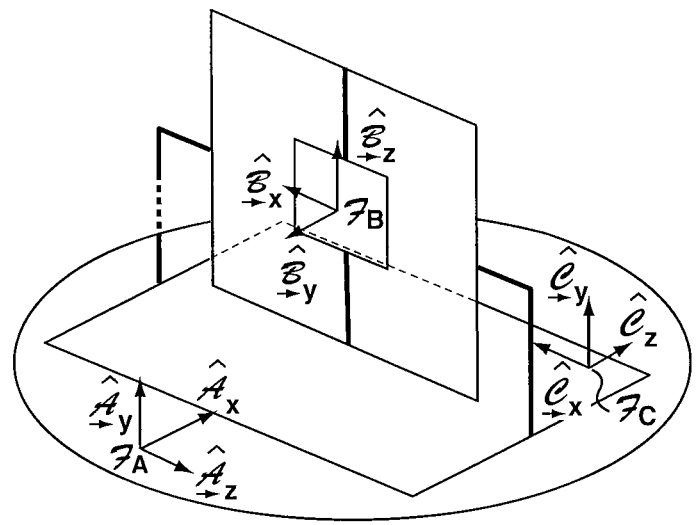

This gimbal assembly has one fixed element and three rotating elements. Reference frames are shown in FIG. 8 attached to the outer-most element of the gimbal mechanism (reference frame $\mathcal{F}_A$, attached to base 825), to the next-inner-most element of the gimbal mechanism (reference frame $\mathcal{F}_C$, attached to upper turntable 834), and to the inner-most element of the gimbal mechanism (reference frame $\mathcal{F}_B$, attached to gravity gradiometer 810). FIGS. 9A-9C show three gimbal configurations. In FIG. 9a the three reference frames are all aligned in the same orientation. In this orientation, the gravity gradiometer is sensitive to $\Gamma_{A_{xy}}$. By rotating the gravity gradiometer about the inner-most gimbal axis (i.e., the z-axis of frame $\mathcal{F}_B$), the instrument also becomes sensitive to $\Gamma_{A_{xx}}-\Gamma_{A_{yy}}$; using the version of the method as shown in several embodiments above, by making three measurements at various rotation angles about that axis, the values of b, $\Gamma_{A_{xy}}$ and $\Gamma_{A_{xx}}-\Gamma_{A_{yy}}$ can be determined.

Next, the gimbal mechanism is returned to the configuration shown in FIG. 9a, and then reoriented by rotating the outer-most gimbal axis by an angle of 90°, to the configuration shown in FIG. 9b. In this orientation, the $\mathcal{F}_B$ reference frame attached to the gravity gradiometer has now been reoriented, so that its z-axis is parallel to the x-axis of $\mathcal{F}_A$. In this orientation, it can be shown that the gravity gradiometer is sensitive to the $\Gamma_{A_{yz}}$ component of $\Gamma_A$. By once again rotating the gravity gradiometer about the inner-most gimbal axis (i.e., the z-axis of frame $\mathcal{F}_B$), the instrument also becomes sensitive to $\Gamma_{A_{yy}}-\Gamma_{A_{zz}}$. By making three measurements at various rotation angles about that axis, the values of b, $\Gamma_{A_{yz}}$ and $\Gamma_{A_{yy}}-\Gamma_{A_{zz}}$ can be determined. (The value of b thus determined will be the same value determined in the previous step along with $\Gamma_{A_{xy}}$ and $\Gamma_{A_{xx}}-\Gamma_{A_{yy}}$, to within the measurement accuracy of the instrument).

Next, the gimbal mechanism is returned to the configuration shown in FIG. 9b, and then reoriented by rotating the middle gimbal axis (which is parallel to the x-axis of $\mathcal{F}_C$) by an angle of 90°, to the configuration shown in FIG. 9c. In this orientation, the $\mathcal{F}_B$ reference frame attached to the gravity gradiometer has now been reoriented, so that its z-axis is anti-parallel to the y-axis of $\mathcal{F}_A$. In this orientation, it can be shown that the gravity gradiometer is sensitive to the $\Gamma_{A_{xz}}$ component of $\Gamma_A$. By once again rotating the gravity gradiometer about the inner-most gimbal axis (i.e., the z-axis of frame $\mathcal{F}_B$), the instrument also becomes sensitive to $\Gamma_{A_{xx}}-\Gamma_{A_{zz}}$. By making three measurements at various rotation angles about that axis, the values of b, $\Gamma_{A_{xz}}$ and $\Gamma_{A_{xx}}-\Gamma_{A_{zz}}$ can be determined. (The value of b thus determined will be the same value determined in the previous steps along with $\Gamma_{A_{xy}}$, $\Gamma_{A_{xx}}-\Gamma_{A_{yy}}$, $\Gamma_{A_{yz}}$ and $\Gamma_{A_{yy}}-\Gamma_{A_{zz}}$, to within the measurement accuracy of the instrument).

This embodiment thus allows three of the off-diagonal components ($\Gamma_{A_{xy}}$, $\Gamma_{A_{yz}}$ and $\Gamma_{A_{xz}}$) of the local gravity gradient tensor, as projected onto reference frame $\mathcal{F}_A$, to be determined. Due to the symmetry of the gravity gradient tensor, and hence of the gravity gradient matrix $\Gamma_A$, the other three off-diagonal components ($\Gamma_{A_{yx}}$, $\Gamma_{A_{zy}}$ and $\Gamma_{A_{zx}}$) are equal to these. It remains to determine the three diagonal components of $\Gamma_A$. These can be determined from the values of $\Gamma_{A_{xx}}-\Gamma_{A_{yy}}$, $\Gamma_{A_{yy}}-\Gamma_{A_{zz}}$ and $\Gamma_{A_{xx}}-\Gamma_{A_{zz}}$. Consider, for example, the sum of $\Gamma_{A_{xx}}-\Gamma_{A_{yy}}$ and $\Gamma_{A_{xx}}-\Gamma_{A_{zz}}$:

$$(\Gamma_{A_{xx}}-\Gamma_{A_{yy}})+(\Gamma_{A_{xx}}-\Gamma_{A_{zz}})=2\Gamma_{A_{xx}}-\Gamma_{A_{yy}}-\Gamma_{A_{zz}} \quad (16)$$

Recalling that the gravity gradient tensor satisfies Laplace's equation, which can be written as:

$$\Gamma_{A_{xx}}+\Gamma_{A_{yy}}+\Gamma_{A_{zz}}=0 \quad (17)$$

Then by adding equations (16) and (17):

$$(\Gamma_{A_{xx}}-\Gamma_{A_{yy}})+(\Gamma_{A_{xx}}-\Gamma_{A_{zz}})=3\Gamma_{A_{xx}} \quad (18)$$

Thus, the first diagonal element of $\Gamma_A$ is equal to one-third of the sum of $\Gamma_{A_{xx}}-\Gamma_{A_{yy}}$ and $\Gamma_{A_{xx}}-\Gamma_{A_{zz}}$. The other two diagonal elements can be determined similarly:

$$\Gamma_{A_{xx}} = \frac{1}{3}(\Gamma_{A_{xx}} - \Gamma_{A_{yy}}) + (\Gamma_{A_{xx}} - \Gamma_{A_{zz}})$$

$$\Gamma_{A_{yy}} = \frac{1}{3}(\Gamma_{A_{yy}} - \Gamma_{A_{zz}}) - (\Gamma_{A_{xx}} - \Gamma_{A_{yy}}) \quad (19)$$

$$\Gamma_{A_{zz}} = -\frac{1}{3}(\Gamma_{A_{xx}} - \Gamma_{A_{zz}}) - (\Gamma_{A_{yy}} - \Gamma_{A_{zz}})$$

This embodiment has thus shown how to determine all of the components of $\Gamma_A$, and hence of the local gravity gradient tensor, using a three-axis gimbal with any type of CCGG (ILR or OQR) that is sensitive to $\Gamma_{B_{xy}}$ and which has a constant measurement bias.

In some embodiments, the complete gravity gradient tensor can be determined using a pair of gravity gradiometers mounted on a two-axis gimbal. This may offer advantages over the embodiments described immediately above, in cases where adding a third gimbal axis is less desirable than adding an additional gravity gradiometer. For example, in certain applications it may be desirable to minimize the overall volume of the measurement apparatus. Non-limiting examples include when the gravity gradiometer will be mounted to a land vehicle, a submersible vehicle, a personal carrier, a down-hole vehicle, a down-mine vehicle, a spacecraft, or an aircraft to move the gravity gradiometer between a plurality of locations, which may be useful to identify at least one subsurface geological feature based on a plurality of gravity gradient tensor measurements.

Figure 10:
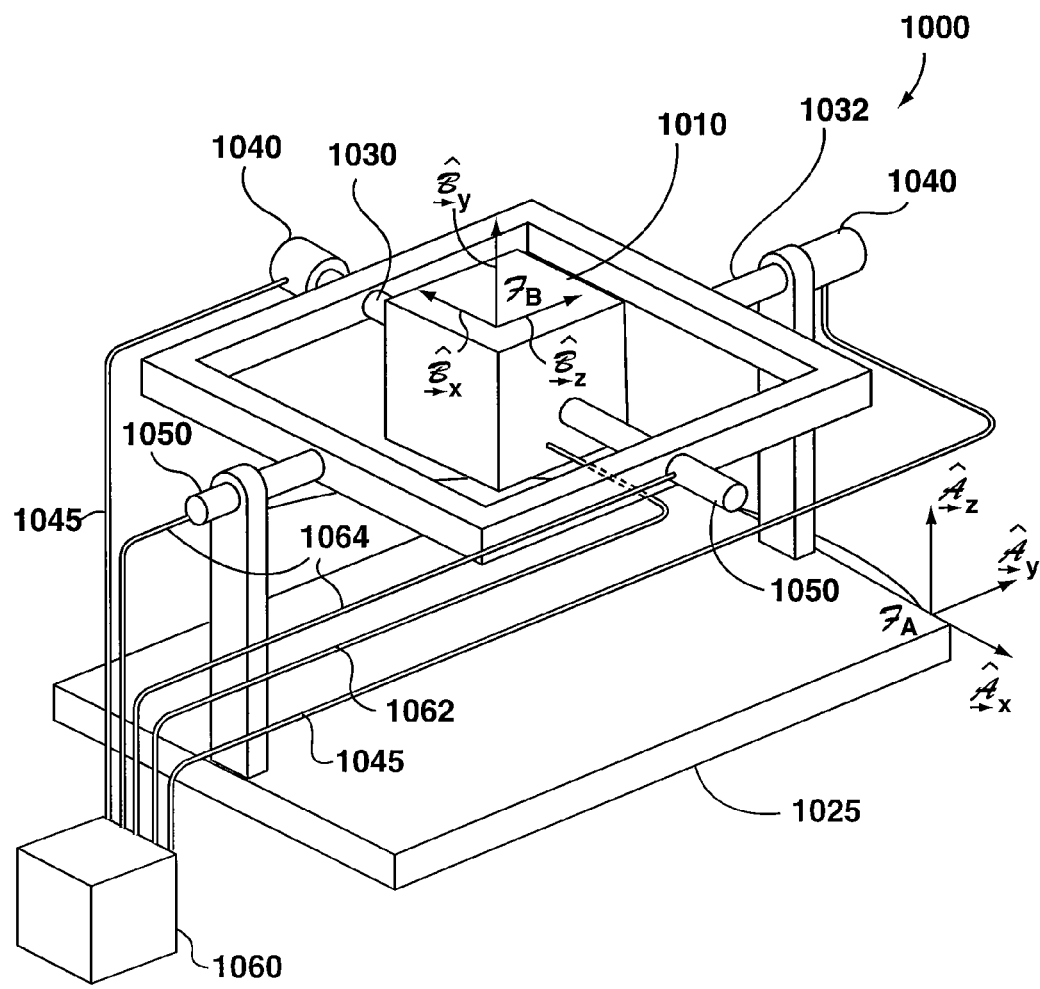
FIG. 10 is an example embodiment of an instrument assembly comprising a gravity gradiometer mounted within a two-axis gimbal mechanism.

FIG. 10 shows an example embodiment of an instrument assembly 1000 comprising a gravity gradiometer 1010 mounted within a two-axis gimbal mechanism, which is designed to rotate the gravity gradiometer on about the x-axis of the gravity gradiometer fixed reference frame $\mathcal{F}_B$, and independently about the y-axis of the reference frame $\mathcal{F}_A$ which is fixed to the stationary base of the gimbal. Also shown in FIG. 10 are two motors 1040 to drive the gimbal mechanisms, two angle sensors 1050 to measure those motions, electronics 1060 to control the gimbal mechanisms and read-out the gravity gradiometer, and control cables 1045 and signal cables 1062, 1064. The electronics 1060 may include a processor (not shown) and computer readable storage media (not shown) with instructions stored thereon to instruct the processor to reorient the gravity gradiometer using the gimbal motors and record measurement data from the gravity gradiometer and gimbal angle sensors. The control cables 1045 permit the processor to control the motors 1040. The gradiometer signal cables 1062 permit the processor to read measurement signals from the gravity gradiometer 1010. The gimbal sensor cables 1064 transmit data from the gimbal angle sensors 1050 to the electronics 1060.

Figure 12:
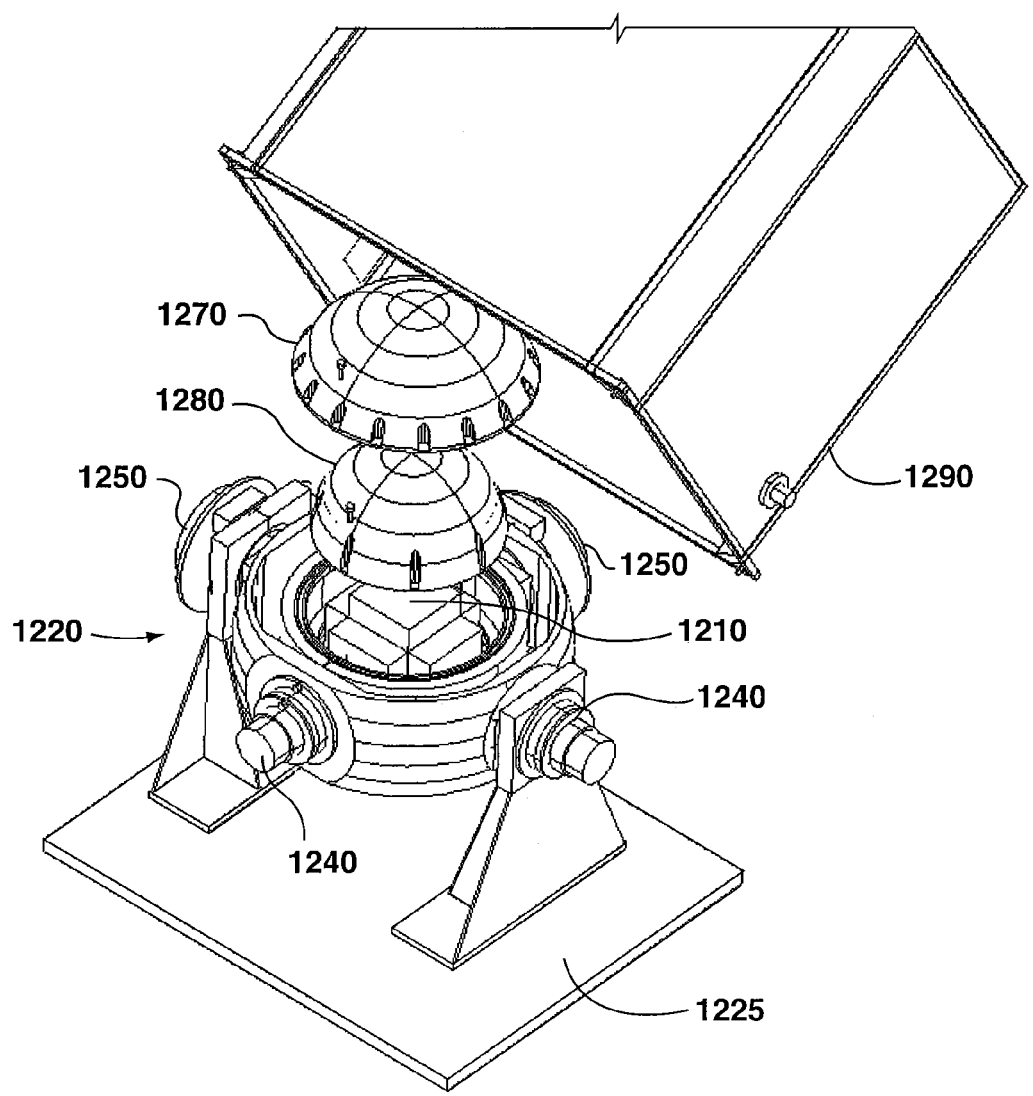
FIG. 12 is an example embodiment of an instrument assembly comprising a gravity gradiometer mounted within a two-axis gimbal mechanism and a vacuum chamber.

FIG. 12 shows another example embodiment of an instrument assembly comprising a gravity gradiometer 1210 mounted within a two-axis gimbal 1220. The gimbal 1220 is driven by two motors 1240, and two angle sensors 1250 measure those motions. In this embodiment, the gravity gradiometer 1210 is mounted within an inner shell 1280, which is itself located within a vacuum chamber 1270. The gimbal assembly is attached to a baseplate 1225, and a lid 1290 is also provided as an enclosure for the entire assembly.

Figure 11:
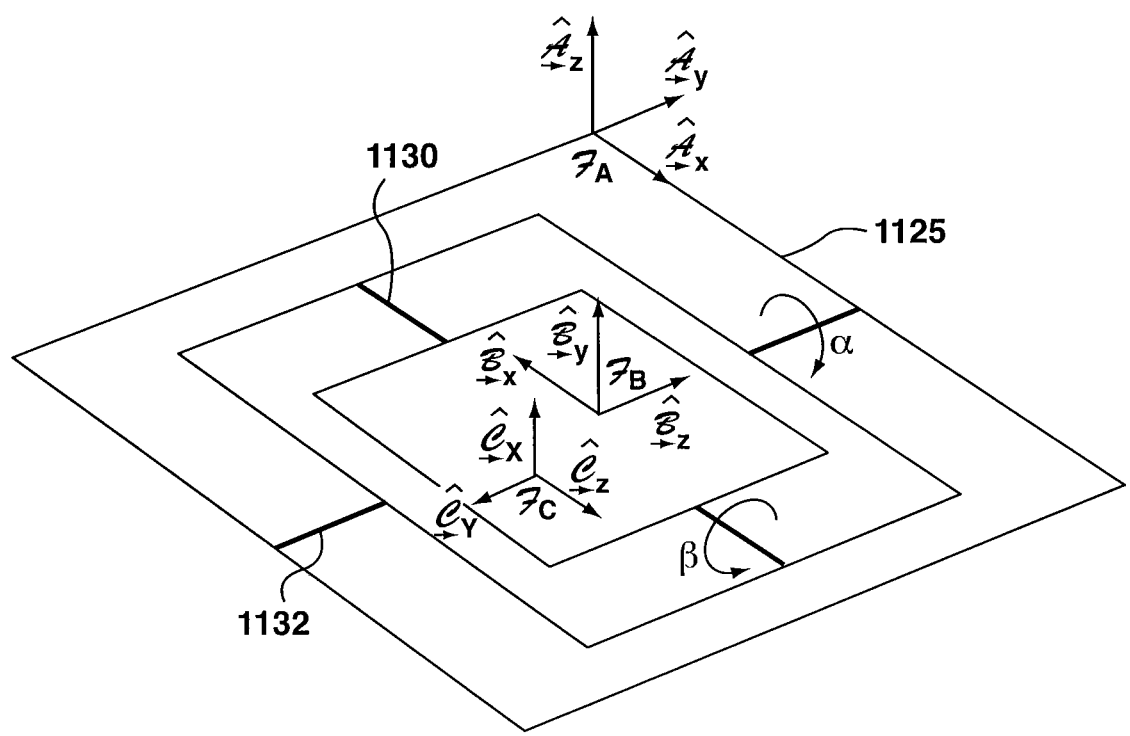
FIG. 11 is a schematic representation of the two-axis gimbal mechanism from FIG. 10.

The two-axis gimbal as shown in FIG. 10, which is shown schematically in FIG. 11, has a base, an inner rotating gravity gradiometer mounting platform, and inner and outer gimbal axes. The configuration shown in FIG. 11 may be defined as Configuration #1. Rotations of the outer and inner gimbal axes are defined by the rotation angles α and β as shown, with the configuration shown in FIG. 11 defining the zero values for these two angles. Additionally, this embodiment applies to a pair of CCGGs (e.g., OQRs or ILRs) that are sensitive to the $\Gamma_{xy}$ terms of the gravity gradient matrix, each in their own coordinate frame. Denoting the two CCGG instruments as B and C, instrument B is sensitive to $\Gamma_{B_{xy}}$ in the reference frame $\mathcal{F}_B$ that is shown in FIG. 11, and instrument C is sensitive to $\Gamma_{C_{xy}}$ in the reference frame $\mathcal{F}_C$, where both $\mathcal{F}_B$ and $\mathcal{F}_C$ are fixed to the gravity gradiometer mounting platform in the orientations shown. As the gimbal axes are rotated to different values of α and β, the orientations of $\mathcal{F}_B$ and $\mathcal{F}_C$ will rotate with respect to $\mathcal{F}_A$, a reference frame which is fixed to the outer frame of the gimbal mechanism. Additionally, this embodiment applies in the case where the two gravity gradiometers each have a constant measurement bias, denoted here as $b_B$ and $b_C$.

In Configuration #1, gravity gradiometer B will be sensitive to $\Gamma_{A_{xz}}$ as well as to its bias $b_B$. Denoting this measurement as $B_1$, then $$B_1 = b_B + k_{xz}\Gamma_{A_{xz}} \quad (20)$$

In the same configuration gravity gradiometer C will be sensitive to $\Gamma_{A_{yz}}$ as well as to its bias $b_C$. Denoting this measurement as $C_1$, then $$C_1 = b_C + k_{yz}\Gamma_{A_{yz}} \quad (21)$$

Next, reorient the instrument to Configuration #2 by rotating the inner gimbal to an angle β=90°, while leaving the outer gimbal at an angle of α=0°. In this configuration, gravity gradiometer C will again be sensitive to $\Gamma_{A_{yz}}$, but with the opposite sign, as well as to its bias $b_C$. Denoting this measurement as $C_2$, then $$C_2 = b_C - k_{yz}\Gamma_{A_{yz}} \quad (22)$$

Adding equations (22) and (21) produces the results that $$b_C = (C_2 + C_2)/2 \quad (23)$$

and $$\Gamma_{A_{yz}} = (C_2 - C_2)/2k_{yz} \quad (24)$$

Next, reorient to Configuration #3 by rotating the inner gimbal to an angle of α=45° while leaving the outer gimbal at an angle of α=0°. In this configuration, gravity gradiometer C will be sensitive to $\Gamma_{A_{yy}} - \Gamma_{A_{zz}}$, as well as to its bias $b_C$. Denoting this measurement as $C_3$, then $$C_3 = b_C + k_{yy\text{-}zz}(\Gamma_{A_{yy}} - \Gamma_{A_{zz}}) \quad (25)$$

Combining equations (25) and (23), $$\Gamma_{A_{yy}} - \Gamma_{A_{zz}} = (C_3 - b_C)/k_{yy\text{-}zz} = (C_3 - (C_2 + C_2)/2)/k_{yy\text{-}zz} \quad (26)$$

Next, reorient the instrument to Configuration #4, by rotating the inner gimbal to an angle of β=0°, and the outer gimbal at an angle of α=90°. In this configuration, gravity gradiometer B will again be sensitive to $\Gamma_{A_{xz}}$, but with the opposite sign, as well as to its bias $b_B$. So that $$B_4 = b_B - k_{xz}\Gamma_{A_{xz}} \quad (27)$$

Adding the equations (27) and (20) produces the results that $$b_B = (B_1 + B_4)/2 \quad (28)$$

and $$\Gamma_{A_{xz}} = (B_1 - B_4)/2k_{xz} \quad (29)$$

Also in this configuration, gravity gradiometer C will be sensitive to $\Gamma_{A_{xy}}$ as well as to its bias $b_C$:

$$C_4 = b_C + k_{xy}\Gamma_{A_{xy}} \quad (30)$$

Knowing the value of $b_C$, from (23), thus the value of $\Gamma_{A_{xy}}$:

$$\Gamma_{A_{xy}} = (C_4 - b_C)/k_{xy} \quad (31)$$

Combining equations (31) and (23), $$\Gamma_{A_{xy}} = (C_4 - b_C)/k_{xy} = (C_4 - (C_1 + C_2)/2)/k_{xy} \quad (32)$$

Next, reorient the instrument to Configuration #5, by rotating the inner gimbal to an angle of β=45°, and leaving the outer gimbal at an angle of α=90°. In this configuration, gravity gradiometer C will be sensitive to $\Gamma_{A_{xx}} - \Gamma_{A_{yy}}$ as well as to its bias $b_C$:

$$C_5 = b_C + k_{xx\text{-}yy}(\Gamma_{A_{xx}} - \Gamma_{A_{yy}}) \quad (33)$$

Knowing the value of $b_C$ from (23), thus the value of $\Gamma_{A_{xx}} - \Gamma_{A_{yy}}$ is:

$$\Gamma_{A_{xx}} - \Gamma_{A_{yy}} = (C_5 - b_C)/k_{xx\text{-}yy} \quad (34)$$

Combining equations (34) and (23), $$\Gamma_{A_{xx}} - \Gamma_{A_{yy}} = (C_5 - b_C)/k_{xx\text{-}yy} = (C_5 - (C_1 + C_2)/2)/k_{xx\text{-}yy} \quad (35)$$

Next, reorient the instrument to Configuration #6, by rotating the inner gimbal to an angle of β=0°, and rotating the outer gimbal to an angle of α=45°. In this configuration, gravity gradiometer B will be sensitive to $\Gamma_{A_{xx}} - \Gamma_{A_{zz}}$ as well as to its bias $b_B$:

$$B_6 = b_B + k_{xx\text{-}zz}(\Gamma_{A_{xx}} - \Gamma_{A_{zz}}) \quad (36)$$

Knowing the value of $b_B$ from (28), thus the value of $\Gamma_{A_{xx}} - \Gamma_{A_{zz}}$ is:

$$\Gamma_{A_{xx}} - \Gamma_{A_{zz}} = (B_6 - b_B)/k_{xx\text{-}zz} \quad (37)$$

Combining equations (37) and (28), $$\Gamma_{A_{xx}} - \Gamma_{A_{zz}} = (B_6 - b_B)/k_{xx\text{-}zz} = (B_6 - (B_1 + B_4)/2)/k_{xx\text{-}zz} \quad (38)$$

Thus the two gravity gradiometer biases $b_B$ and $b_C$, can be determined, along with three of the off-diagonal components ($\Gamma_{A_{xy}}$, $\Gamma_{A_{yz}}$ and $\Gamma_{A_{xz}}$) of the local gravity gradient tensor, as projected onto reference frame $\mathcal{F}_A$, to be determined. Due to the symmetry of the gravity gradient tensor, and hence of the gravity gradient matrix $\Gamma_A$, the other three off-diagonal components ($\Gamma_{A_{yx}}$, $\Gamma_{A_{zy}}$ and $\Gamma_{A_{zx}}$) are equal to these. In addition, it allows the quantities $\Gamma_{A_{xx}} - \Gamma_{A_{yy}}$, $\Gamma_{A_{xx}} - \Gamma_{A_{yy}}$ and $\Gamma_{A_{xx}} - \Gamma_{A_{zz}}$ to be determined. From these quantities, the three diagonal components of $\Gamma_A$ may be determined by using equation (19). This embodiment has thus shown how to determine all of the components of $\Gamma_A$, and hence of the local gravity gradient tensor, using a pair of CCGGs each of which is sensitive to the $\Gamma_{xy}$ term of the gravity gradient matrix with respect to its own gravity gradiometer fixed reference frame, where the two gravity gradiometers are mounted in suitable orientations to the inner rotating element of a two-axis gimbal mechanism, and where each gravity gradiometer has its own constant measurement bias.

While the above mathematical development shows a simple closed-form method of solving for the two biases and the gravity gradient matrix components, it will be apparent to one skilled in the art that the same outcome is achievable by casting the eight linear equations (20), (21), (22), (25), (27), (30), (33) and (36) into a matrix equation of the form m=Ax as used in the method described above, with a measurement column matrix $$m = [B_1 C_1 C_2 C_3 B_4 C_4 C_5 B_6]^T \quad (39)$$

and with a column matrix of unknown quantities $$m = [b_B b_C \Gamma_{A_{xy}} \Gamma_{A_{yz}} \Gamma_{A_{xz}} (\Gamma_{A_{xx}} - \Gamma_{A_{yy}})(\Gamma_{A_{xx}} - \Gamma_{A_{yy}})(\Gamma_{A_{xx}} - \Gamma_{A_{zz}})]^T \quad (40)$$

which can be determined be calculating $x = A^{-1} m$. Similarly it will be apparent to one skilled in the art that various other orientations of the two gravity gradiometers with respect to the inner element of the gimbal mechanism, and various other sequences of gimbal configurations can be used to achieve the same result, and that all of these are specific versions of the general method described above, which additionally allows incorporation of Laplace's equation into the matrix equation to allow for direct solution of the diagonal elements of $\Gamma_A$, and allows for other variations such as incorporating the effects of time-varying biases, and of making additional, redundant measurements.

In another aspect of the general method described above, a DCGG (e.g., an ILR similar to the one shown schematically in FIG. 5) that is sensitive to the $\Gamma_{B_{zz}}$ component of $\Gamma_B$ in some instrument-fixed reference frame $\mathcal{F}_B$, which has a constant bias, and which is mounted in a 3-axis gimbal such as the one shown in FIG. 8, can be used to determine all three diagonal components of the gravity gradient tensor by making measurements with the gimbal in the three configurations shown in FIG. 9. In the first gimbal mechanism configuration, as shown in FIG. 9a, the measurement made by the gravity gradiometer will be $m_1 = b + k_{zz} \Gamma_{A_{zz}}$. In the second gimbal mechanism configuration, as shown in FIG. 9b, the measurement made by the gravity gradiometer will be $m_2 = b + k_{xx} \Gamma_{A_{xx}}$. In the third gimbal mechanism configuration, as shown in FIG. 9c, the measurement made by the gravity gradiometer will be $m_3 = b + k_{yy} \Gamma_{A_{yy}}$. Writing these 3 measurement equations, along with Laplace's equation (17) results in the matrix equation m=Ax:

$$\begin{bmatrix} m_1 \\ m_2 \\ m_3 \\ 0 \end{bmatrix} = \begin{bmatrix} 1 & 0 & 0 & k_{zz} \\ 1 & k_{xx} & 0 & 0 \\ 1 & 0 & k_{yy} & 0 \\ 0 & 1 & 1 & 1 \end{bmatrix} \begin{bmatrix} b \\ \Gamma_{A_{xx}} \\ \Gamma_{A_{yy}} \\ \Gamma_{A_{zz}} \end{bmatrix} \quad (41)$$

As the matrix A in this equation is invertible, the unknowns in x can be determined by calculating $x = A^{-1} m$. Note that Laplace's equation has been used here as a "virtual measurement equation", to introduce the fact derived from physical law that gravitation is a conservative force, and hence its underlying potential field satisfies Laplace's equation. The general method described above may always be augmented in this way by Laplace's equation.

It will be apparent to one skilled in the art that the general methods apply not only to the specific embodiments detailed above, but also to variations of those embodiments that make use of different models of the manner in which instrument measurement bias varies with respect to time, as well as to variations that involve greater or fewer measurements, within the requirements on the number of measurements that are described herein. Those variants include the special case in which the instrument measurement bias is constant with respect to time.

The methods described above for bias-correcting gravity gradiometer measurements enable additional methods of gravity gradiometry. For example, relatively slow changes in the gravity gradient tensor field at some location in space (e.g. at some point on the surface of the Earth) can be monitored. This involves first emplacing a gravity gradiometer instrument at that location, supported within a gimbal mechanism that can be used to control its orientation (e.g., a one-axis, two-axis or three-axis gimbal as described above). This instrument is then used to make an initial series of measurements with the gravity gradiometer in several orientations, as described above, and those measurements are post-processed using one or more of the above methods to determine bias-corrected values of at least one gravity gradient tensor component at that location, along with parameters that specify the instrument's measurement bias over the course of those measurements. Those initial measurements might all, for example, be collected over the course of one day. Then, some time later (for example, the next day or the next month), a similar set of measurements would be collected at the same location, and be post-processed to determine later bias-corrected values of the gravity gradient tensor components at that location. If the gravity gradient field had changed between the first and second set of measurements, then this can be determined by comparing the bias-corrected values of the gravity gradient tensor components that were determined using the earlier set of measurements, with those that were determined using the later set of measurements. Further sets of measurements may then be made at later times, resulting in the determination of further sets of bias-corrected gravity gradient tensor components, which may then be compared with the earlier bias-corrected tensor component values to determine changes with time of these components further into the future. That is, despite the fact that each of the gravity gradiometer measurements is a relative measurement (i.e., a measurement which contains a measurement bias), by determining the bias-corrected (i.e. absolute) values of the gravity gradient tensor components via the above methods, allowing slow changes in the gravity gradient field at that location to be discerned, something that is difficult or impossible to do without bias-correcting the measurements. Note that these measurements may be made with a single gravity gradiometer instrument which is left in a single location over a long period of time, or an instrument which is moved to other locations after each set of measurements and then moved back to the original location for each subsequent set of measurements, or by using different gravity gradiometers at that location for each set of measurements.

Another example application is monitoring changes over the course of time in a sub-surface reservoir containing some fluid. This application is referred to as 4D reservoir monitoring. For example, a sub-surface oil reservoir may contain a mass of oil which is being pumped out of the reservoir over time. It may be useful to the operators of that oil-field to track the rate at which different parts of the reservoir drain; for example, that knowledge can be used to determine where to apply actions which can accelerate the local rate of drainage (e.g., injection of steam), in order to optimize recovery of oil from the reservoir. Oil has mass, and the presence of oil in the rock in a particular part of such a reservoir generally causes the local density in that volume to change, which in turn can contribute measurably to the gravity gradient field at or below the surface above that part of the reservoir; draining of the oil from that part of the reservoir can thus cause the gravity gradient field there to change measurably. This method can be used to monitor those gravity gradient field changes with respect to time. These changes are generally slow, measurable change generally occurring over the course of months or years, time-scales for which some of the embodiments are well-suited. From those changes, one may be able to infer changes in the amount of oil in each part of the reservoir.

Another example application is monitoring changes over the course of time of water contained in sub-surface aquifers. Such aquifers contain water which generally seeps in from above, due to rainfall over the course of long periods of time. Water is also withdrawn from such aquifers by such activities as pumping water from wells for irrigation purposes, and to provide drinking water. In areas of water scarcity, management of aquifers may be an important activity, for example in order to plan where to drill new wells, and to decide how much water is to be allowed to be pumped from wells in one area of the aquifer versus another. The embodiments described above for monitoring changes in oil-reservoir contents may also be applied to monitoring changes in water-aquifer contents.

Another example application is monitoring a volcano with a gravity gradiometer instrument, over the course of a long period of time, to measure changes in sub-surface density distribution due to the flow of magma from deep chambers underground into the volcano, and to monitor changes in the mass of the volcano as a whole. This would involve placing a gravity gradiometer instrument at a location on or near a volcano, and determining absolute (e.g. bias-corrected) values of local gravity gradient tensor components at that location at various times. Such information could have scientific use in the study of volcanoes; it could also have practical use in helping to predict changes in volcanoes related to imminent eruptions.

Another example application enabled by determining bias-corrected values of at least one component of a gravity gradient tensor, is to make use of a gravity gradiometer instrument with a relatively large amount of bias drift to make accurate determinations of a time-invariant gravity gradient field at multiple locations from a vehicle which moves intermittently. In some embodiments this involves mounting a gravity gradiometer in gimbal mechanism that can be used to control its orientation, and mounting that assembly onto a vehicle, which could be a surface vehicle such as a truck, or a marine vehicle such as a boat. A survey is then carried out by first moving the vehicle to an initial survey station location, and bringing the vehicle to a halt. For a land vehicle such as a truck, coming to a halt is self-explanatory. For a marine vehicle such as a boat, this may involve anchoring the vehicle. The gravity gradiometer is then used to make static measurements in each of several orientations (including at least a first orientation and a second orientation) at that location, and determining bias-corrected gravity gradient tensor components and bias from these measurements. The vehicle is then moved to a second location, and further measurements are again taken and either processed at each location or recorded for later processing. This is repeated for as many station locations as are in the survey. The end result is a set of bias-corrected gravity gradient tensor locations at a number of survey station locations. That is, despite the fact that each of the gravity gradiometer measurements is a relative measurement, which may drift by a large and unpredictable amount over the course of the survey, thus making it difficult or impossible to meaningfully compare the measurements made at different locations, by determining the absolute (i.e., bias-corrected) values of the gravity gradient tensor components at each station location, which do not suffer from such large and unpredictable bias changes from station to station, meaningful comparisons of measurements between the stations can be made.

Another example application is determining bias-corrected gravity gradient tensor components at many station locations, from which underground density distributions may be inferred, from which in turn features of the geology underlying the survey area may be inferred.

Another example application is to mount the gimbal-controlled gradiometer on a vehicle which is capable of travelling within an underground mine. By doing so, a gravity gradiometer may be used to determine bias-corrected gravity gradient tensor component values at various locations underground. This information may be used to infer the density distributions in the rock surrounding the mine, potentially improving on other means for determining those density distributions. These density distribution estimates may then be used to make improved inferences regarding the composition of the rocks surrounding the mine tunnels, information which may be used to guide further development of the mine, for example by determining in which directions high-grade ore lies.

Another example application is conducting similar geophysical surveys on the surface of a celestial body other than the Earth, such as the Moon, Mars or an asteroid. The technique would be essentially the same as in the example survey applications described above. However, it is likely that vehicles for such applications would be remotely controlled, which would likely result in them moving from one location to another more slowly than would be the case for a vehicle on Earth driven by a person. This would make the station-to-station errors due to instrument bias drift even larger, for a given amount of bias drift per unit time, if the instrument's measurement biases were left uncorrected. Thus determining bias-corrected gravity gradient tensor components could provide even more benefit for this application, than for terrestrial vehicle-mounted survey applications.

Another example application is using a gravity gradiometer instrument which may have a relatively large amount of bias drift, to make accurate determinations of a time-invariant gravity gradient field at multiple locations using an instrument which is carried from place to place by a person. It is possible to build a gravity gradiometer which is small enough, and light-weight enough, to be carried by a person, for example in any suitable carrier, such as a backpack, in much the same way that other geophysical survey instruments are carried into the field by people. However, reducing the size of such an instrument to that extent may result in an increased amount of instrument bias drift. By mounting a gravity gradiometer in a gimbal mechanism that can be used to control its orientation, and mounting that mechanism in a carrier (such as a backpack) such that it can be carried by a person, bias-corrected gravity gradient tensor components can be determined in accordance with embodiments disclosed herein. A survey is then carried out by the person first moving the instrument to an initial survey station location, and bringing the instrument to a halt, for example by setting it down on the ground. The gravity gradiometer is then used to make static measurements in each of several orientations at that location, and the above general method is used to determine absolute gravity gradient tensor components and bias from these measurements. The person then moves the instrument to a second location, and further measurements are again taken and processed. This is repeated for as many station locations as are in the survey. The end result is a set of absolute gravity gradient tensor components at a number of survey station locations.

This could enable gravity gradiometer measurements to be taken in places that are difficult or impossible to access via a vehicle, such as on steep hillsides, in rugged terrain, or down a narrow mineshaft or tunnel.

Another example application is using a gravity gradiometer instrument which may have a relatively large amount of bias drift, to make accurate determinations of a time-invariant gravity gradient field at multiple locations down a borehole. Such a borehole might, for example, be an oil well. A gravity gradiometer instrument mounted in a suitable gimbal mechanism would be inserted into such a borehole, and transported down the length of the borehole by a drill-string or other suitable transport. In order to be able to fit in the confined space of such a borehole, such a gravity gradiometer plus gimbal assembly would need to be very compact, which could lead to the measurement bias drift of the instrument being relatively large. Multiple measurements at different orientations at each of several static locations can be taken along the borehole, and embodiments described above can be used to determine bias-corrected components of the gravity gradient tensor at those locations, along with instrument measurement bias parameters.

This could enable applications such as monitoring the drainage of oil from an oil-well over time, by making measurements along the length of such a borehole into an oil-field at various points in time (e.g., once per year). This could allow better management of the extraction of oil from the oil-field.

Another example application is using a gravity gradiometer instrument with a relatively large amount of bias drift, to make accurate determinations of a time-invariant gravity gradient field at multiple locations from a vehicle which moves continuously, but slowly enough that over the duration of one set of measurements the change in the gravity gradient tensor field is relatively small. Achieving such a slowly-changing gravity gradient field could be done by moving the vehicle slowly. It could also be accomplished by locating the vehicle relatively far away from the closest masses which generate the gravity gradient field, as the minimum spatial wavelength of a gravity gradient field is roughly equal to the distance away from the closest mass-sources. This method involves mounting a gravity gradiometer in a gimbal mechanism that can be used to control its orientation, and mounting that assembly in a suitable vehicle. The vehicle is then set in motion, and the gimbal mechanism is commanded to re-orient the instrument through a sequence of configurations, holding the instrument static in each configuration for the duration of each measurement. The sequence of gimbal reorientations is continued as the vehicle travels along its path. The measurements taken during each configuration in each sequence are processed using the above general method, to recover an estimate of one or more of the local gravity gradient tensor components, along with instrument bias parameters. The end result is a set of absolute gravity gradient tensor components at a number of survey station locations. These tensor components will contain some residual error caused by the fact that the gravity gradient signal is seen to change with time in a reference frame attached to the moving vehicle. However, the magnitude of that residual error can be made smaller by one of moving the vehicle more slowly, and operating the vehicle along a path that is farther removed from source-masses, or both.

One example application of this method is to make a large-scale, low-resolution geophysical survey of the Earth, by flying such a gravity gradiometer instrument aboard a high-altitude aircraft. At a great height above the ground, the rate of change of the local gravity gradient field as seen in an aircraft-fixed reference frame could change slowly enough to result in adequately low residual errors using this method. At a sufficient height, such an aircraft might fly at a high enough speed to cover a very large amount of survey area very rapidly, allowing such a survey to be economically attractive.

Another example application of this method is to carry out a similar geophysical survey of the Earth, but from an even higher altitude, aboard a satellite orbiting the Earth. Satellites must operate much higher than any aircraft, which will help to reduce the rate of change of the local gravity gradient field with respect to time to an acceptable level. In this application the instrument would measure gravity gradient components along the satellite's orbital path; unlike in the case of airborne surveys, a satellite cannot be commanded to change direction back and forth, so such a survey may require combining the absolute gravity gradient tensor components collected along multiple orbit path segments.

Another example application of this method is to carry out a similar geophysical survey of another celestial body than the Earth, for example the Moon, Mars or an asteroid, aboard a spacecraft orbiting such a celestial body. The technique here would be much the same as the technique used in a survey using an Earth-orbiting instrument.

Another example application of this method is to carry out a similar geophysical survey, but in this case of some portion of the sea-floor or the floor of a lake, with the instrument carried by a submersible vehicle, for example a submarine or a towed fish. In this case the submersible would travel along a path at some suitable speed and depth. Submersible vehicles naturally move fairly slowly (e.g., compared to aircraft), making them naturally suitable for application of this method. The time-variation of the local gravity gradient field may be selected in this case, to some extent, by choosing the depth at which the submersible is to operate, so as to maintain a sufficient distance from the sea-floor.

While certain embodiments described above relate to methods for determining a measurement bias that varies with time, a person skilled in the art will recognize that embodiments of the methods can be applied not only to gravity gradiometers which have bias which drift as a function of time, but also to gravity gradiometers which have a constant bias, through suitable definition of the bias basis functions. For example, it has been shown above how to apply this method to the case of an Eötvös torsion balance instrument whose bias varies linearly with time, by modeling bias variation with time as $b=b_0+b_1 t$, with two basis functions: a function that is constant with time with a coefficient $b_0$, and a function that increases linearly with time with a coefficient $b_1$; this increases the number of unknown quantities by two, and requires the addition of at least two measurements to the measurement set, in order to result in an invertible A matrix. The same general approach can be applied to any gravity gradiometer, although a person skilled in the art will recognize that the instrument's measurement equation, the set of measurement orientations and times, and the details of the resulting A matrix will differ from one instrument to the next.

In the case where the instrument has a constant bias, this can be accommodated by instead using as a bias error model $b=b_0$, with just one basis function, a function that is constant with time with a coefficient $b_0$; this increases the number of unknown quantities by just one, and requires the addition of at least one measurement to the measurement set, in order to result in an invertible A matrix.

Note that the specific embodiments described here are examples only, and are not an exhaustive list of all possible methods for recovering gravity gradient tensor components and bias using this general technique. To one experienced in the art, further specific embodiments, in addition to the examples shown here, could be derived using knowledge of the gravity gradient tensor and of rotated reference frames. In particular, while most of the examples are chosen to make use of a rotation about a single, principal axis of a gravity gradiometer to produce several orientations, the general technique is not so limited. Those examples are chosen here as they are simpler to write out than examples involving rotations about several axes at once, or in sequence, and hence make for better illustrative examples. To illustrate the more general case, an example is also included which involves sequential rotations about several different axes.

The invention claimed is:

1. A method of determining a bias-corrected value of at least one component of a gravity gradient tensor, the method comprising:
   a) using a gravity gradiometer positioned in a first orientation to take a first measurement of at least one component of the gravity gradient tensor, wherein the first measurement is taken at a first time;
   b) using the gravity gradiometer positioned in a second orientation to take a second measurement of at least one component of the gravity gradient tensor, wherein the second measurement is taken at a second time;
   c) using the gravity gradiometer to take a third measurement of at least one component of the gravity gradient tensor, wherein the third measurement is taken at a third time, wherein, for the third measurement, the gravity gradiometer is positioned in one of the first orientation, the second orientation, and a third orientation;
   d) determining a measurement bias of the gravity gradiometer based on the first, second, and third measurements, wherein the measurement bias varies with time; and
   e) determining the bias-corrected value of at least one component of the gravity gradient tensor based on the first, second and third measurements.

2. The method of claim 1, wherein the gravity gradiometer is: (i) held static in the first orientation when taking the first measurement, (ii) held static in the second orientation when taking the second measurement, and (iii) held static in one of the first, second, and third orientations when taking the third measurement.

3. The method of claim 2, wherein the third measurement is taken when the gravity gradiometer is in the third orientation.

4. The method of claim 1, wherein the measurement bias of the gravity gradiometer is determined based on an expected behaviour of the measurement bias of the gravity gradiometer with respect to time, and the expected behaviour is expressed as a function, wherein the function comprises at least one coefficient.

5. The method of claim 4, wherein the function is a polynomial function.

6. The method of claim 4, wherein determining the bias-corrected value of at least one component of the gravity gradient tensor further comprises:
   a) forming a measurement matrix comprising a row number equal to the number of measurements taken;
   b) forming a square invertible observation matrix comprising a number of observation matrix rows equal to the number of measurements taken and a number of observation matrix columns equal to a sum of: (i) a number of the bias-corrected values of the component of the gravity gradient tensor to be determined, and (ii) a number of the at least one coefficient;
   c) inverting the square invertible observation matrix to determine an inverted observation matrix; and
   d) determining a matrix product of the inverted observation matrix and the measurement matrix, wherein the matrix product comprises the bias-corrected value of at least one component of the gravity gradient tensor and a value for each of the at least one coefficient.

7. The method of claim 4, wherein determining the bias-corrected value of at least one component of the gravity gradient tensor further comprises:
   a) forming a measurement matrix comprising a row number equal to the number of measurements taken;
   b) forming a rectangular observation matrix of full column rank comprising a number of observation matrix rows equal to the number of measurements taken and a number of observation matrix columns equal to a sum of: (i) a number of the bias-corrected values of a component of the gravity gradient tensor to be determined, and (ii) a number of the at least one coefficient; wherein the number of observation matrix rows is greater than the number of observation matrix columns;
   c) determining an inverted observation matrix by determining a left generalized inverse of the rectangular observation matrix; and
   d) determining a matrix product of the inverted observation matrix and the measurement matrix, wherein the matrix product comprises the bias-corrected value of at least one component of the gravity gradient tensor and a value for each of the at least one coefficient.

8. The method of claim 1, wherein the gravity gradiometer is a Cross-Component Gravity Gradiometer (CCGG).

9. The method of claim 8, wherein the gravity gradiometer is an Orthogonal Quadrupole Responder (OQR) type gravity gradiometer.

10. The method of claim 8, wherein the gravity gradiometer is an In-Line Responder (ILR) type gravity gradiometer.

11. The method of claim 1, wherein the gravity gradiometer is sensitive to at least two components of the gravity gradient tensor in any selected reference frame.

12. The method of claim 11, wherein the gravity gradiometer is a Multi-Component Gravity Gradiometer (MCGG).

13. The method of claim 1, wherein the gravity gradiometer is a Diagonal-Component Gravity Gradiometer (DCGG).

14. The method of claim 1, further comprising performing steps (a)-(c) in each of a plurality of locations to identify at least one subsurface geological feature.

15. The method of claim 14, wherein the plurality of locations are located on a celestial body.

16. The method of claim 15, wherein the celestial body is selected from the group comprising the Moon, an asteroid, and Mars.

17. The method of claim 14 further comprising mounting the gravity gradiometer on a land vehicle to move the gravity gradiometer between the plurality of locations.

18. The method of claim 14 further comprising mounting the gravity gradiometer on a submersible vehicle to move the gravity gradiometer between the plurality of locations, wherein the plurality of locations are under water.

19. The method of claim 14 further comprising mounting the gravity gradiometer in a carrier to permit a person to carry the gravity gradiometer between the plurality of locations.

20. The method of claim 14 further comprising mounting the gravity gradiometer on a down-hole vehicle to move the gravity gradiometer between the plurality of locations, wherein the plurality of locations are located under ground.

21. The method of claim 14 further comprising mounting the gravity gradiometer on a down-mine vehicle to move the gravity gradiometers between the plurality of locations, wherein the plurality of locations are located in a mine.

22. The method of claim 15 further comprising mounting the gravity gradiometer on a spacecraft to move the gravity gradiometer between the plurality of locations.

23. The method of claim 14 further comprising mounting the gravity gradiometer on an aircraft to move the gravity gradiometer between the plurality of locations.

24. The method of claim 1, further comprising performing steps (a)-(c) over a period of time for 4D reservoir monitoring.

25. A system for determining a bias-corrected value of at least one component of a gravity gradient tensor, the system comprising:
   a) a gravity gradiometer;
   b) a gimbal adapted to rotate the gravity gradiometer into at least a first orientation and a second orientation;
   c) a control module for controlling the gimbal;
   d) a measurement module for
      i) taking a measurement of at least one component of the gravity gradient tensor at a first time when the when the gravity gradiometer is in the first orientation,
      ii) taking a second measurement of at least one component of the gravity gradient tensor at a second time when the gravity gradiometer is in the second orientation; and
      iii) taking a third measurement of at least one component of the gravity gradient tensor at a third time when the gravity gradiometer is in one of the first orientation, the second orientation, and a third orientation; and
   e) a calculation module comprising a processor configured to determine:
      i) a measurement bias of the gravity gradiometer based on the first, second, and third measurements, wherein the measurement bias varies with time, and
      ii) the bias-corrected value of at least one component of the gravity gradient tensor based on the first, second, and third measurements.

26. The system of claim 25, wherein the apparatus comprises a multi-axis gimbal.

27. The system of claim 25, wherein the gravity gradiometer is a Cross-Component Gravity Gradiometer (CCGG).

28. The system of claim 27, wherein the gravity gradiometer is an Orthogonal Quadrupole Responder (OQR) type gravity gradiometer.

29. The system of claim 27, wherein the gravity gradiometer is an In-Line Responder (ILR) type gravity gradiometer.

30. The system of claim 25, wherein the gravity gradiometer is one of a Diagonal-Component Gravity Gradiometer (DCGG) and a Multi-Component Gravity Gradiometer (MCGG).

31. The system of claim 25, further comprising a vehicle to move the gravity gradiometer between a plurality of locations to identify at least one subsurface geological feature, wherein the gimbal is mounted on the vehicle.

32. The system of claim 31, wherein the vehicle is one of a land vehicle, a submersible vehicle, a boat, a down-hole vehicle, a down-mine vehicle, an aircraft, and a spacecraft.

33. A method of determining a bias-corrected value of at least one component of a gravity gradient tensor, the method comprising:
   a) using a gravity gradiometer positioned in a first orientation to take a first measurement of at least one component of the gravity gradient tensor, wherein the first measurement is taken at a first time, wherein the gravity gradiometer is one of an Orthogonal Quadrupole Responder (OQR) type and an In-Line Responder (ILR) type;
   b) using the gravity gradiometer positioned in a second orientation to take a second measurement of at least one component of the gravity gradient tensor, wherein the second measurement is taken at a second time;
   c) determining a measurement bias of the gravity gradiometer based on the first and second measurements, wherein the measurement bias is constant with respect to time; and
   d) determining the bias-corrected value of at least one component of the gravity gradient tensor based on the first and second measurements.

34. The method of claim 33, wherein the gravity gradiometer measures only one component of the gravity gradient tensor using only the first and second measurements.

35. The method of claim 34, wherein the gravity gradiometer measures the $\Gamma_{B_{xy}}$ component of the gravity gradient tensor in a selected instrument-fixed reference frame $\mathcal{F}_B$, wherein the second orientation is rotated 90 degrees with respect to the first orientation.

36. The method of claim 34, wherein the gravity gradiometer measures the $\Gamma_{B_{xz}}$ component of the gravity gradient tensor in a selected instrument-fixed reference frame $\mathcal{F}_B$, wherein the second orientation is rotated 180 degrees with respect to the first orientation.

37. The method of claim 14 further comprising mounting the gravity gradiometer on a boat to move the gravity gradiometer between the plurality of locations on a body of water, wherein the plurality of locations are on a surface of the body of water.

* * * * *